(12) United States Patent
Umphrey

(10) Patent No.: US 12,535,795 B1
(45) Date of Patent: Jan. 27, 2026

(54) METHODS AND SYSTEMS FOR PREDICTING LAYER-WISE PHYSICAL BEHAVIORS IN ADDITIVE MANUFACTURING

(71) Applicant: ANSYS, Inc., Canonsburg, PA (US)

(72) Inventor: Clancy Umphrey, Park City, UT (US)

(73) Assignee: ANSYS, INC., Canonsburg, PA (US)

( * ) Notice: Subject to any disclaimer, the term of this patent is extended or adjusted under 35 U.S.C. 154(b) by 694 days.

(21) Appl. No.: 17/346,075

(22) Filed: Jun. 11, 2021

(51) Int. Cl.
  *G05B 19/4099* (2006.01)
  *B22F 10/80* (2021.01)
  *B33Y 50/00* (2015.01)

(52) U.S. Cl.
  CPC .......... *G05B 19/4099* (2013.01); *B22F 10/80* (2021.01); *B33Y 50/00* (2014.12); *G05B 2219/35134* (2013.01); *G05B 2219/49023* (2013.01)

(58) Field of Classification Search
  CPC ...... G05B 19/4099; G05B 2219/35134; G05B 2219/49023; B33Y 50/00; B22F 10/80
  See application file for complete search history.

(56) References Cited

U.S. PATENT DOCUMENTS

| 2019/0337232 | A1* | 11/2019 | Prabha Narra | ......... B22F 10/80 |
| 2020/0341452 | A1* | 10/2020 | Bi | ............................ B22F 12/90 |
| 2021/0124857 | A1* | 4/2021 | Matusik | ................... G06N 3/08 |

OTHER PUBLICATIONS

Christian Gobert, et al. "Conditional generative adversarial networks for in-situ layerwise additive manufacturing data", Solid Freeform Fabrication 2019—Proceedings of the 30th Annual International Solid Freeform Fabrication Symposium, pp. 192-201.

* cited by examiner

*Primary Examiner* — Robert E Fennema
*Assistant Examiner* — Yvonne Trang Follansbee
(74) *Attorney, Agent, or Firm* — Douglas A. Gastright

(57) ABSTRACT

A three-dimensional model (i.e., MCAD model) for additively manufacturing a physical object with a laser is received in a computer system. The laser is controlled or driven by a set of instructions. The instructions specify scan properties for scanning each of multiple deposit layers during the additive manufacturing. Two-dimensional (2D) maps representing the scan properties for the deposit layer are generated. Each 2D map includes values in grid points representing the deposit layer. Each 2D map corresponds to a respective scan property for the deposit layer. A trained machine learning model is invoked to predict a physical behavior of a layer of the physical object based on the 2D maps as an input. The input further includes a state map showing a state of an immediately prior deposit layer. The layer of the physical object corresponds to the deposit layer.

24 Claims, 25 Drawing Sheets

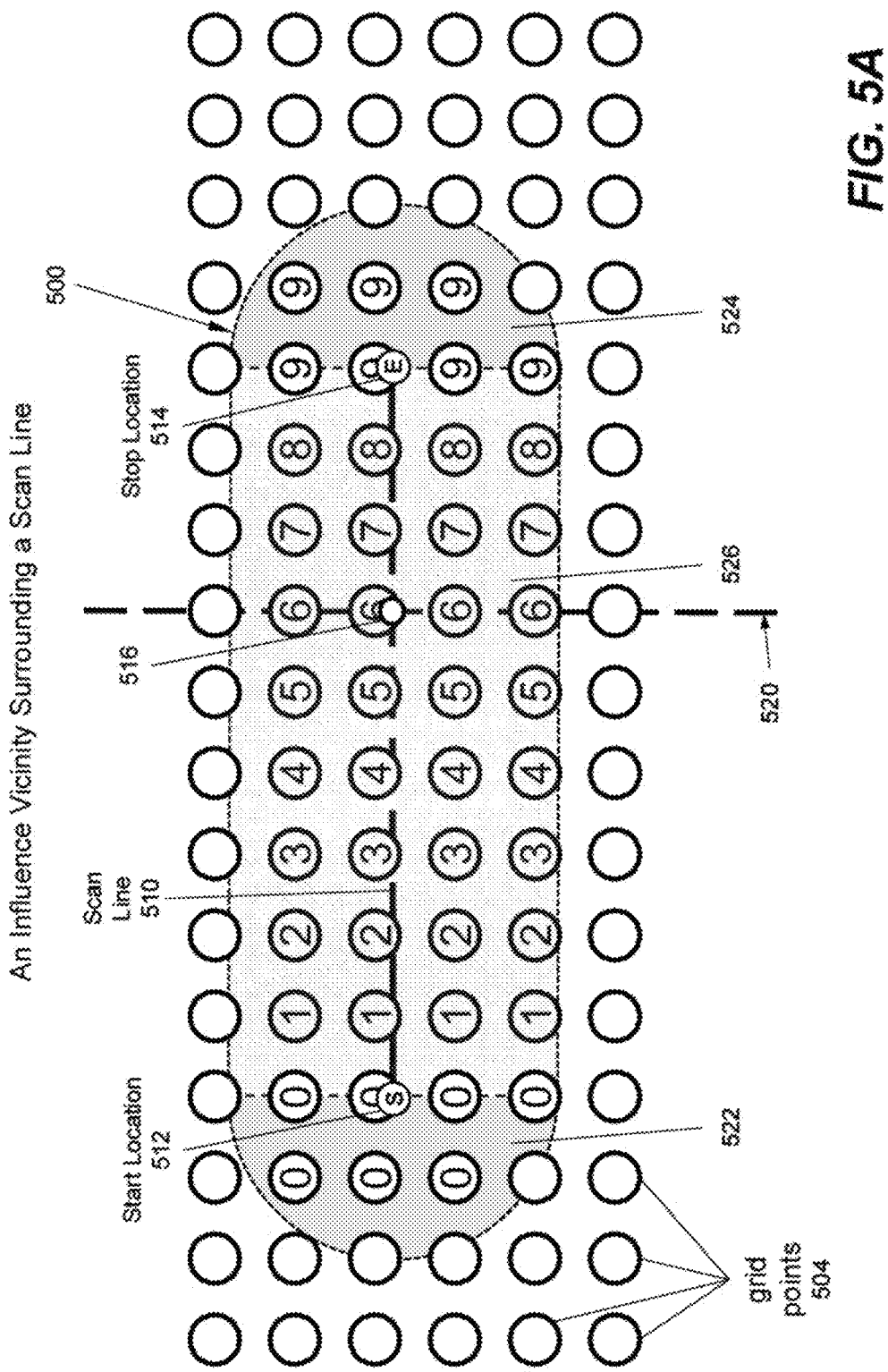

614

730

800

802 — Receive a three-dimensional model for a physical object to be additively manufactured with a laser, the laser is driven by a set of instructions to scan deposit layers for additively manufacturing the physical object, the set of instructions specifies scan properties for scanning each deposit layer

804 — Simulate a physical behavior of a layer of the physical object additively manufactured via scanning a deposit layer based on scan properties of the deposit layer

806 — Generate 2D maps representing the scan properties for the deposit layer, each 2D map includes values in grid points representing the deposit layer, each 2D map corresponds to a respective scan property for the deposit layer

808 — Create a machine learning model for predicting the physical behavior of the layer of the physical object using the 2D maps

822 — Identify a portion of the 2D grid points associated with a scan line, each grid point in the identified portion is located within an influence vicinity surrounding the scan line 824 — Determine a value of a respective scan property associated with a location along the scan line based on the set of instructions 826 — Assign the determined value as a value of a grid point in the identified portion, the grid point is located within the influence vicinity corresponding to the location along the scan line

832 — Assign a respective laser property value corresponding to the start location of a scan line as a value of grid points located within a semi-circular area behind the start location 834 — Assign a respective laser property value corresponding to a particular location of a scan line between the start location and the stop location as a value of grid points located within a rectangular area straddling the scan line and each of the grid points and the particular location are substantially normal to the scan line at the particular location 836 — Assign a respective laser property value corresponding to the stop location of a scan line as a value of grid points located within a semi-circular area past the stop location

842 — Receive a three-dimensional model for a physical object to be additively manufactured with a laser, which is driven by a set of instructions to scan deposit layers for the physical object, the instructions specify scan properties for scanning each deposit layer

844 — Generate two-dimensional (2D) maps representing the scan properties for a deposit layer, each 2D map includes values in grid points representing the deposit layer, each 2D map corresponding to a respective scan property for the deposit layer

846 — Invoke a trained machine learning model to predict a physical behavior of a layer of the physical object based on the 2D maps, the layer of the physical object corresponds to the deposit layer

*FIG. 8D*

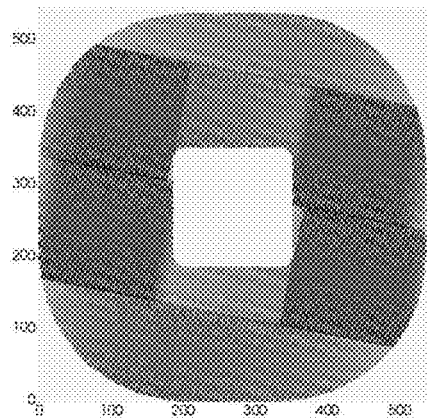
2D Map – Laser Elapsed Time Measured From The Onset of Scanning Each Scan Line
912
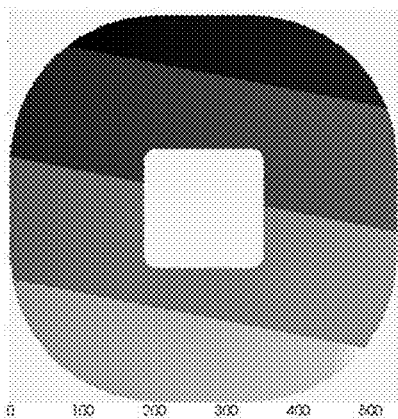
2D Map – Laser Elapsed Time Measured From The Onset of Scanning The Deposit Layer
914
FIG. 9B

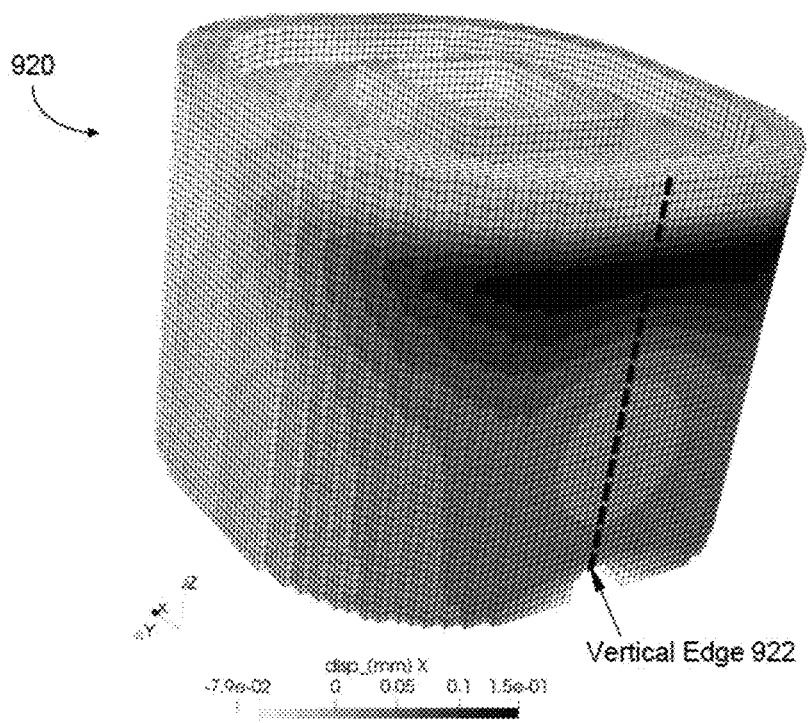
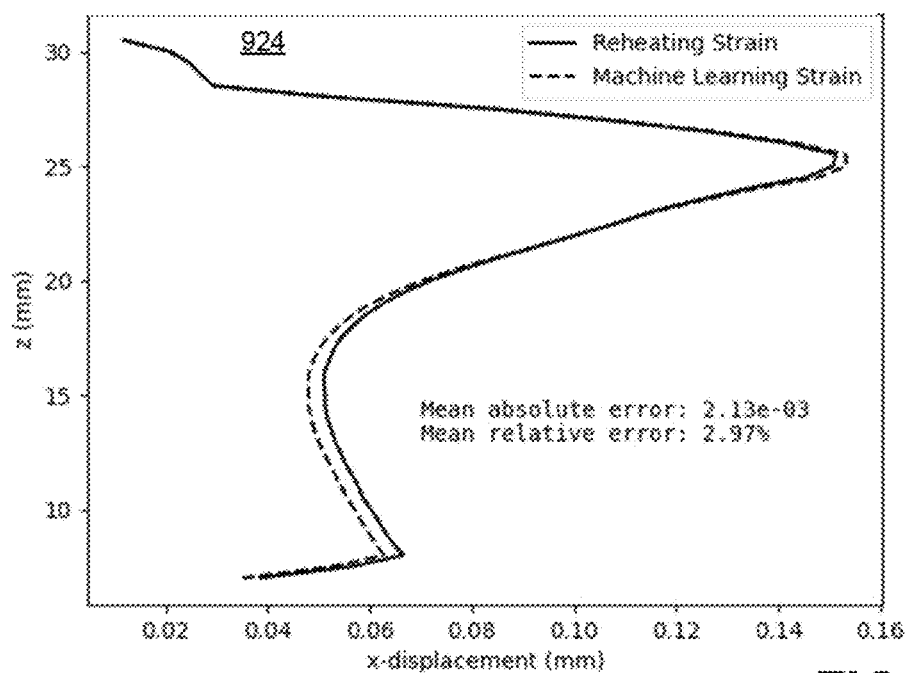
FIG. 9C

METHODS AND SYSTEMS FOR PREDICTING LAYER-WISE PHYSICAL BEHAVIORS IN ADDITIVE MANUFACTURING

FIELD

The subject matter described herein relates to additive manufacturing, more particularly to methods and systems for predicting layer-wise physical behaviors of a physical object in additive manufacturing.

BACKGROUND

Additive manufacturing refers to technologies that grow three-dimensional objects one superfine layer at a time. Each successive layer bonds to the preceding layer of melted or partially melted material. Objects are digitally defined by computer-aided-design (CAD) software that is used to create STL files, which are the triangulated mesh that represents the surface of the CAD model. A slicer program uses the STL files to generate machine instructions for each ultra-thin layer needed to build up the 3D part. This information guides the path of a nozzle or print head as it precisely deposits material upon the preceding layer. Or, a laser or electron beam selectively melts or partially melts in a bed of powdered material. As materials cool or are cured, they fuse together to form a three-dimensional object.

Laser powder bed fusion (LPBF) process is one of the additive manufacturing (AM) techniques designed to use a high power-density laser to melt and fuse metallic powder together. During the part (i.e., three-dimensional physical object) forming in LPBF process, thermal distortion is one big problem due to the thermal stress which is caused by the high cooling rate and temperature gradient. Therefore, it is important to know the effect of process parameters on thermal and stress evolution in each layer. Prior approaches have been using simulations (e.g., finite element analysis) to obtain thermal strains.

SUMMARY

Methods and systems are disclosed for predicting a physical behavior of a layer of a physical object in additive manufacturing via machine learning. In one aspect of the disclosure, a three-dimensional model for additively manufacturing a physical object with a laser is received in a computer system. The laser is controlled or driven by a set of instructions. The instructions specify scan properties for scanning each of multiple deposit layers during the additive manufacturing. A physical behavior of a layer of the physical object can be obtained in a simulation. The physical behavior of a layer of the physical object can also be obtained from physical measurements, for example, experimental data. The simulation simulates scanning each of the deposit layers based on scan properties for the deposit layer in the instructions. Two-dimensional (2D) maps representing the scan properties for the deposit layer are generated. Each 2D map includes values in grid points representing the deposit layer. Each 2D map corresponds to a respective scan property for the deposit layer. A machine learning model is created for predicting the physical behavior of the layer of the physical object using the 2D maps as an input. The input further includes a state map showing a state of an immediately prior deposit layer.

In another aspect, the set of instructions includes at least one scan line for scanning the deposit layer. Each scan line has a start location and a stop location. Scanning the deposit layer by the laser includes scanning the scan line from the start location to the stop location. The scan line can be a straight line segment. The scan line can also be a curved line segment. Generation of 2D maps includes identifying a portion of the grid points associated with the scan line. The identified portion includes grid points located within a first semi-circular area of the influence vicinity corresponding to the start location. The identified portion includes grid points located within a second semi-circular area of the influence vicinity corresponding to the stop location. The identified portion further includes grid points located within a rectangular area of the influence vicinity corresponding to a particular location of the scan line between the start location and the stop location. Each of the grid points within the rectangular area and the particular location are aligned substantially normal to the scan line at the particular location.

A value of the respective scan property associated with a location along the scan line is determined based on the instructions. The determined value is assigned as a value of a grid point in the identified portion. The grid point is located within the influence vicinity corresponding to the location along the scan line.

In still another aspect, a three-dimensional model for additively manufacturing a physical object with a laser is received in a computer system. The laser is controlled or driven by a set of instructions. The instructions specify scan properties for scanning each of multiple deposit layers during the additive manufacturing. Two-dimensional (2D) maps representing the scan properties for the deposit layer are generated. Each 2D map includes values in grid points for the deposit layer. Each 2D map corresponds to a respective scan property for the deposit layer. A trained machine learning model is invoked to predict a physical behavior of a layer of the physical object based on the 2D maps as an input. The input further includes a state map showing a state of an immediately prior layer. The layer of the physical object corresponds to the deposit layer.

Non-transitory computer-readable medium (i.e., physically embodied computer program products) is described that stores instructions, which when executed by one or more data processors of one or more computing systems, cause at least one data processor to perform operations herein. Similarly, computer systems are described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store a program and/or data for use by or in connection with an instruction execution system, apparatus, or device. Even if the data in the computer-readable storage medium requires action to maintain the storage of data, such as in a traditional semiconductor-based dynamic random access memory, the data storage in a computer-readable storage medium can be considered to be non-transitory. A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIGS. 5A-5B are schematic diagrams each showing an example influence vicinity surrounding a scan line;

FIG. 8A is a flowchart illustrating an example process of creating a machine learning model for predicting a simulated physical behavior of a layer of a physical object additively manufactured with a laser;

FIG. 8B is a flowchart illustrating an example process of generating 2D maps representing the scan properties with the 2D maps being an input to the machine learning model;

FIG. 8C is a flowchart illustrating an example process of assigning values of scan properties to grid points that represent each of the 2D maps, the 2D maps are the input to the machine learning model;

FIG. 8D is a flowchart illustrating an example process of predicting a simulated physical behavior of a layer of a physical object additively manufactured with a laser using a trained machine learning model;

FIGS. 9A-9D are diagrams showing a comparison study between simulation and machine learning for predicting physical behaviors of an example physical object additively manufactured with a laser;

DETAILED DESCRIPTION

The disclosure describes methods and systems for predicting physical behaviors of a layer of a physical object additively manufactured with a laser via machine learning. The physical object is defined as a three-dimensional model. The laser is controlled or driven by a set of instructions to scan deposit layers for the physical object. The set of instructions contains laser scan properties for each deposit layer, which include a definition of one or more scan lines for the laser to scan. A physical behavior (e.g., thermal strain) of a respective layer that corresponds to the deposit layer can be predicted via a machine learning model. Input to the machine learning model can include two-dimensional (2D) maps for representing laser properties. Each 2D map is represented by 2D structured grid points (e.g., an array of grid points uniformly arranged in a rectangular formation). Each grid point within an influence vicinity surrounding a scan line is assigned a value of a respective laser scan property corresponding to a particular location of the scan line. The scan properties include, but are not limited to, laser speed, laser power, laser distance travelled from the start location of a scan line, laser elapsed time measured from the onset of scanning a deposit layer, laser elapsed time measured from the onset of scanning a scan line. The input further includes a state map showing a state of the immediate prior deposit layer. A trained machine learning model is provided to predict a physical behavior (e.g., thermal strain) of a layer of the physical object. The output of the machine learning model is a map of a predicted physical behavior.

Figure 1:
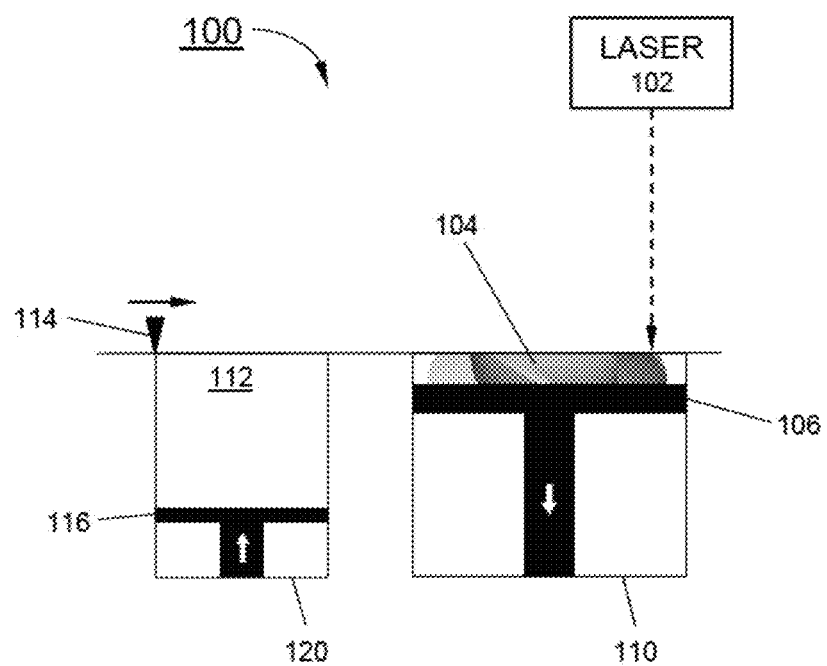
FIG. 1 is a schematic diagram depicting an example machinery setup for additively manufacturing a physical object with a laser.

FIG. 1 is a schematic diagram depicting an example machinery setup 100 for additively manufacturing of a physical object 104 with a laser 102. One of the additive manufacturing processes with a laser is referred to as Laser Power Bed Fusion (LPBF) process. The LPBF process manufactures the physical object 104 from a digital design, for example, a Mechanical Computer-Aided Design (MCAD) model. The machinery setup 100 contains a fabrication powder bed 110 and a powder delivery system 120. In the powder delivery system 120, metal powder 112 are stored on top of a powder delivery piston 116, and are delivered or spread to the fabrication powder bed 110 one deposit layer at a time by a roller 114 (or an equivalent mechanical component). The laser 102 scans each deposit layer to melt or fuse the metal powder together to build a physical object 104 (e.g., a part). The physical object 104 additively manufactured is placed on a fabrication piston 106. The laser 102 may be controlled by a scanning system controlled by the set of instructions generated based on the MCAD model.

Once the laser finishes scanning a deposit layer, the powder delivery piston 116 moves up one deposit layer thickness and the fabrication piston 106 moves down the same distance. The roller 114 spreads the raised metal powder from the powder delivery system 120 to the fabrication system 110. The laser 102 scans the freshly delivered metal powder for a new deposit layer. The LPBF process repeats deposit layer by deposit layer until the entire physical object 104 is created. Loose or unfused powder is then removed.

Figure 2:
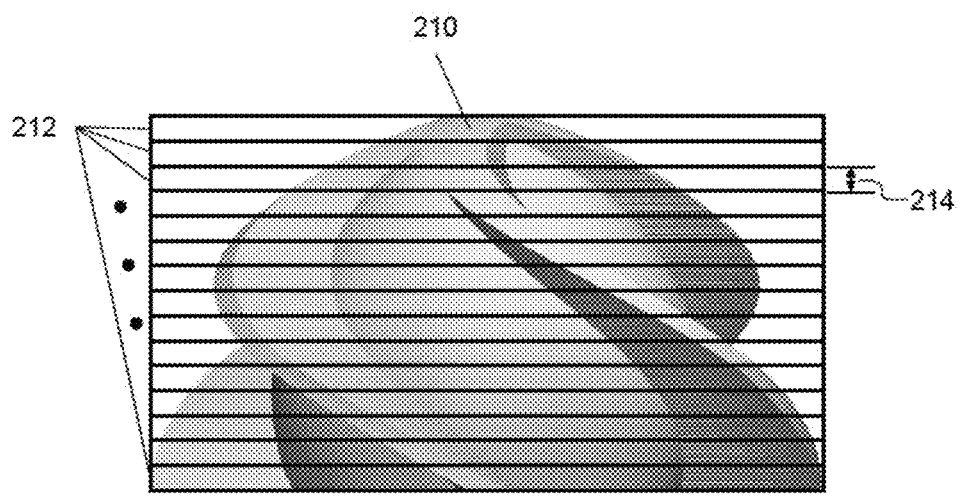
FIG. 2 is a diagram showing an example slicing scheme of a physical object to be additively manufactured.

An example three-dimensional (3D) MCAD model 210 for a physical object to be additively manufactured is shown in FIG. 2. The MCAD model 210 generates a geometry STL file which is processed with a slicer program or software (e.g., 3D slicer) to create a set of instructions for a laser to scan each deposit layer. The slicer program divides the MCAD model 210 (the STL file) into multiple slices or layers 212. For illustration simplicity and clarity, only a few layers 212 are shown. Each layer 212 has a thickness 214, for example, 20 μm. For a physical object with a height of 20 mm, there can be 1000 20-μm layers generated by the slicer program.

Geometry STL file is a file format for stereolithography for 3D printing (e.g., additive manufacturing). STL is also referred to as "Standard Triangle Language" or "Standard Tessellation Language". STL files describe only the surface geometry of a three-dimensional object without any representation of color, texture or other common MCAD model attributes. An STL file describes a raw, unstructured triangulated surface by the unit normal and vertices (ordered by the right-hand rule) of the triangles using a three-dimensional Cartesian coordinate system.

Figure 3A:
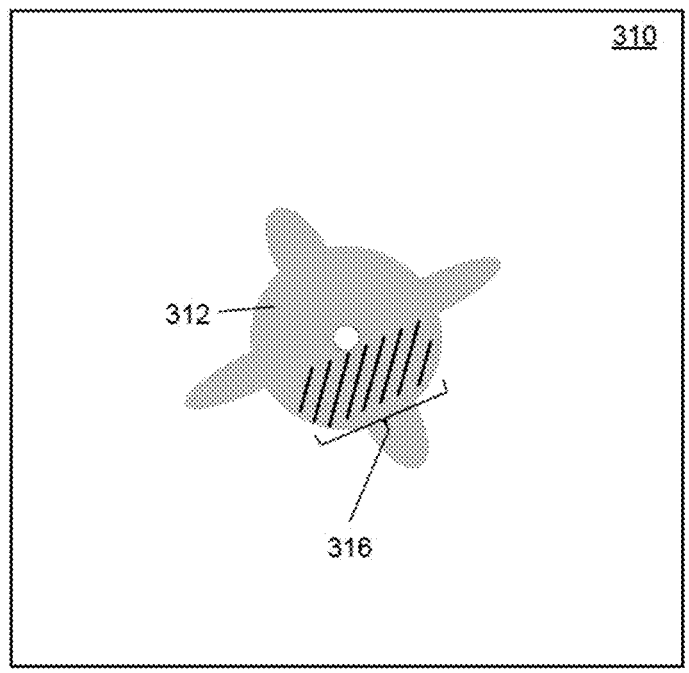
FIG. 3A is a diagram showing an example deposit layer view for the physical object additively manufactured.
Figure 3B:
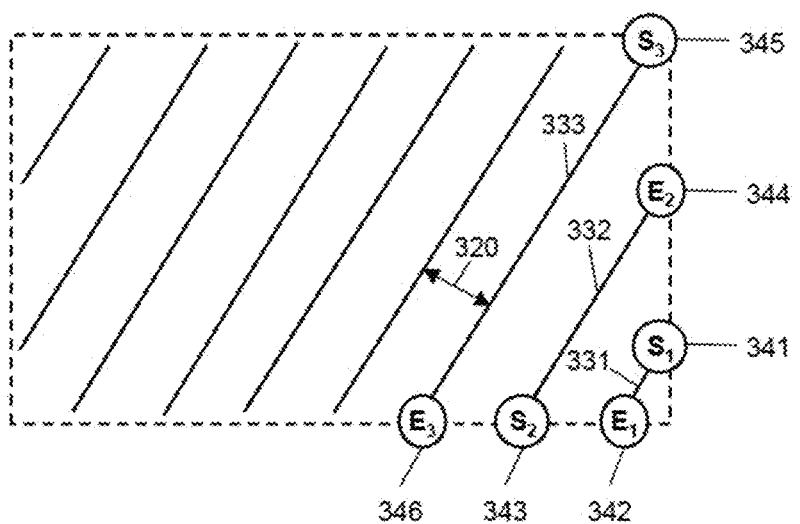
FIG. 3B is a diagram showing example scan lines that define a scan path of a laser in additive manufacturing.

An example deposit layer view 310 shown is FIG. 3A contains a cross-section 312 of the physical object in a layer that corresponds to the deposit layer. The set of instructions for a laser to scan a particular deposit layer includes laser scan properties such as laser speed, laser power, and definitions of scan lines. Each scan line is defined with a start location and a stop location. The start and stop locations can be specified as two-dimensional coordinates in a Cartesian coordinate system. For visual clarity, an example group or block of scan lines 316 are shown overlapped on the cross-section 312. There can be more than one groups or blocks of scan lines defined for each deposit layer. The entire cross-section 312 needs to be scanned by the laser. The laser scans the deposit layer by one scan line at a time from the start location to the stop location of each scan line. FIG. 3B shows example scan lines that define a path of the laser. The laser scan path starts at the start location $S_1$ 341 of the first scan line 331. The laser scans the first scan line 331 from the start location $S_1$ 341 to the stop location $E_1$ 342. Next, the laser moves to the start location $S_2$ 343 of the second scan line 332 to scan the second scan line 332 to the stop location $E_2$ 344. Then the laser scans the third scan line 333 from the start location $S_3$ 345 to the stop location $E_3$ 346, and repeats for the remaining scan lines. The spacing 320 between scan lines is referred to as laser hatch spacing. The time between when the laser stops scanning a scan line and starts scanning a next scan line is referred to as an inter-scan-line time. The start time for a laser to scan each scan line can be calculated with the laser speed, the definition of each scan line and the inter-scan-line time.

Figure 4:
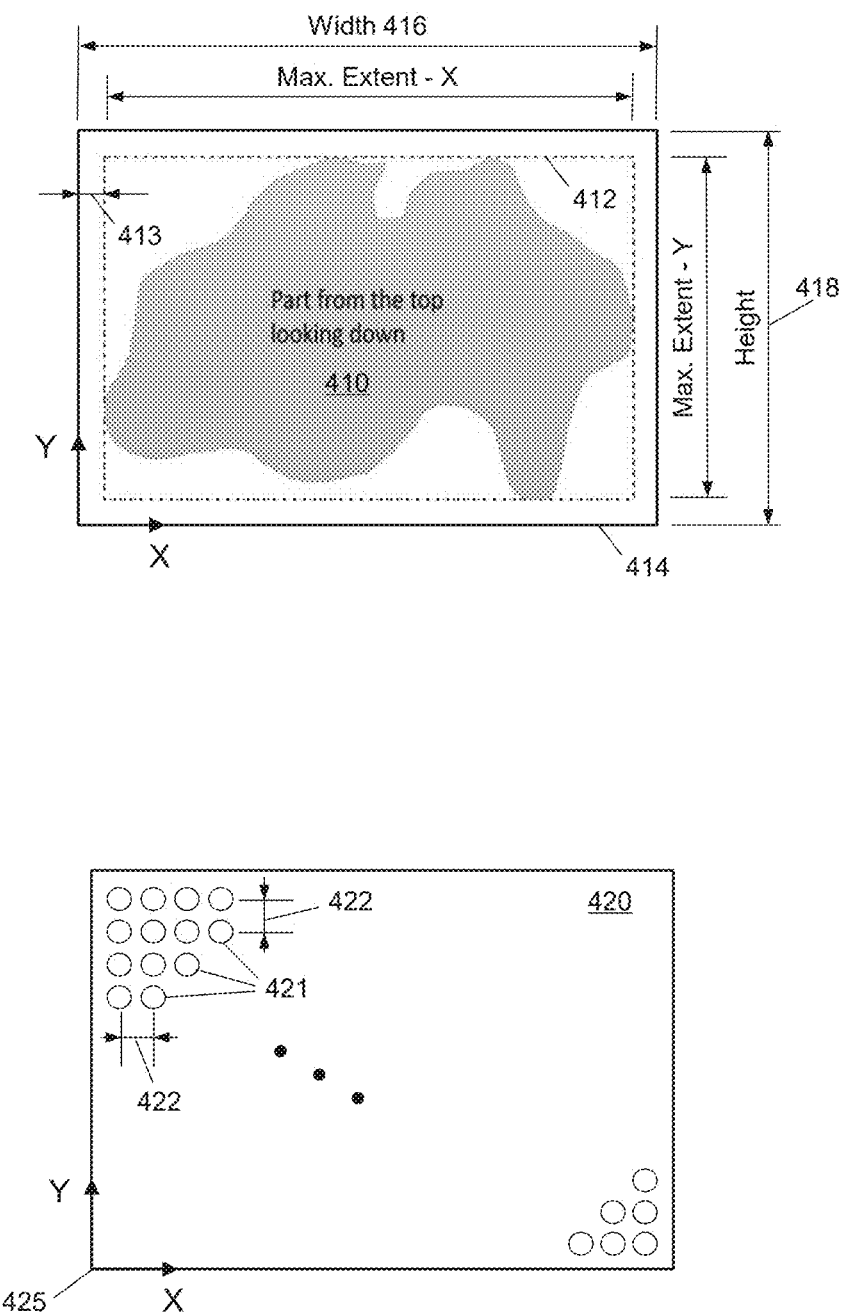
FIG. 4 are diagram showing example grid points representing a 2D map for laser scan property.

To generate 2D maps for representing scan properties for each deposit layer, the maximum dimensions of the physical object are gathered from the geometry STL file, which is generated from the 3D MCAD model. FIG. 4 shows an example projection area footprint 410 of a physical object (i.e., a part from the top looking down) to be additively manufactured. An inner rectangle 412 is defined by the maximum dimension in X-direction and the maximum dimension in Y-direction. A margin 413 around the inner rectangle 412 is added to form an outer rectangle 414 as the size of the 2D map. An array of uniformly arranged grid points 421 is generated for a 2D map 420. Grid points 421 can be generated with uniform a grid point spacing 422 in both X-direction and Y-direction. Each of the grid points 421 is identified by a set of two-dimensional coordinates in a Cartesian coordinate system (e.g., The X-Y coordinate system 425). Grid points 421 are shown in FIG. 4 as hollow circles for visual clarity. In one embodiment, the margin is set to 0.0004 m, the grid point spacing is set to 0.000015 m or 15 μm. The number of grid points in X-direction can then be determined by the width 416 and the grid point spacing 422. The number of grid points in Y-direction can be determined by the height 418 and the grid point spacing 422.

FIG. 5A is a schematic diagram illustrating an influence vicinity 500 (i.e., an obround shape area) surrounding an example scan line 510 in relation with grid points in a 2D map. For illustration simplicity and clarity, only relevant grid points 504 (shown as circles) are shown. The scan line 510 is defined by a start location 512 and a stop location 514. A laser scans the scan line 510 from the start location 512 to the stop location 514. A particular location 516 is a location along the scan line 510 between the start location 512 and the stop location 514. The portion of the grid points 504 in the 2D map is identified to be associated with the scan line 510. For example, the identified portion is the cross-section of the physical object in the deposit layer. Each grid point in the identified portion is located within the influence vicinity 500, i.e., grid points shown with a circled number are located within the influence vicinity 500.

The identified portion includes grid points located within a first semi-circular area 522 of the influence vicinity 500 corresponding to the start location 512 (i.e., grid points shown as circled "0"). The identified portion includes grid points located within a second semi-circular area 524 of the influence vicinity 500 corresponding to the stop location 514 (i.e., grid points shown as circled "9").

The identified portion further includes grid points located within a rectangular area 526 of the influence vicinity corresponding to a particular location of the scan line 510 between the start location 512 and the stop location 514. Each of the grid points within the rectangular area 526 and the particular location are aligned substantially normal to the scan line 510 at the particular location. In the example shown in FIG. 5A, grid points shown as circled "6" are aligned with a particular location 516 substantially normal to the scan line 510 at particular location 516. Value of a respective scan property corresponding to the particular location 516 is assigned to grid points shown as circled "6".

The influence vicinity 500 surrounding a scan line 510 can also be referred to as a laser area of influence. The first semi-circular area 522 is centered at the start location 512. The second semi-circular area 524 is centered at the stop location 514. The radius of the first semi-circular area 522 and of the second semi-circular area 524 is referred to as a radius of influence of the laser. The radius of influence of the laser is related to hatch spacing or scan line spacing. In one embodiment, the radius of influence is set to 0.75 times of hatch spacing, such that the grid points located between two consecutive scan lines would be covered by either influence vicinity.

In a special case, when start location and stop location of a scan line have the same coordinates, the scan line contains a single point. The influence vicinity surrounding the coincided point becomes a circular area (i.e., combining the first semi-circular area and the second semi-circular area).

Figure 5B:
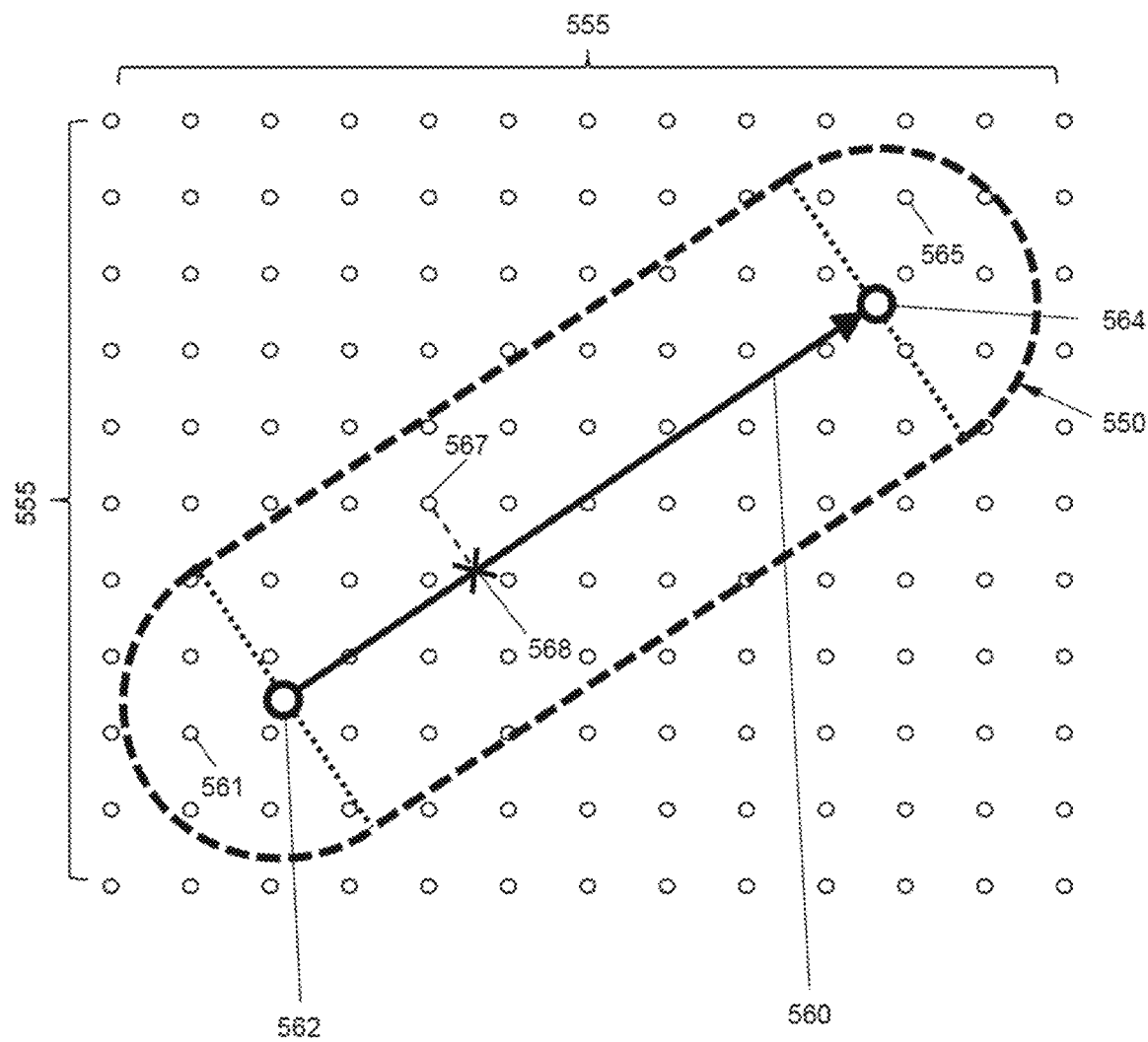

The influence vicinity 500 shown in FIG. 5A is a special case for a scan line parallel to a row of grid points. A more general example influence vicinity 550 (i.e., obround shape area 550) is shown in FIG. 5B. The influence vicinity 550 surrounds a scan line 560 that begins at the start location 562 and ends at the stop location 564. The arrow of the scan line 560 indicates the laser scanning direction. Each deposit layer is covered by grid points as shown in FIG. 4. Only relevant grid points 555 are shown in FIG. 5B for illustration clarity.

Each grid point located within the influence vicinity 550 is assigned a value of respective laser scan properties. To determine such a value, each grid point (e.g., grid point 567) within the influence vicinity 550 is projected to the scan line 560 along a direction normal to the scan line 560 at a particular location 568 (i.e., a projected location). If it is determined that a grid point (e.g., grid point 561) is located behind the start location 562 of the scan line 560, the grid point 561 is assigned the value of the laser scan properties corresponding to the start location 562. If a grid point (e.g., grid point 565) is located passed the stop location 564, the grid point 565 is assigned the value of the laser scan properties corresponding to the stop location 564.

If the grid point (e.g., grid point 567) is located between the start location 562 and the stop location 564, the grid point 567 is assigned the value of the laser scan properties corresponding to the particular location 568. For example, the laser travelled distance corresponding to the particular location 568 is the distance between the start location 562 and the particular location 568. For the general example shown in FIG. 5B, each grid point located between the start and stop locations can have a different value of the laser scan properties.

Figure 6A:
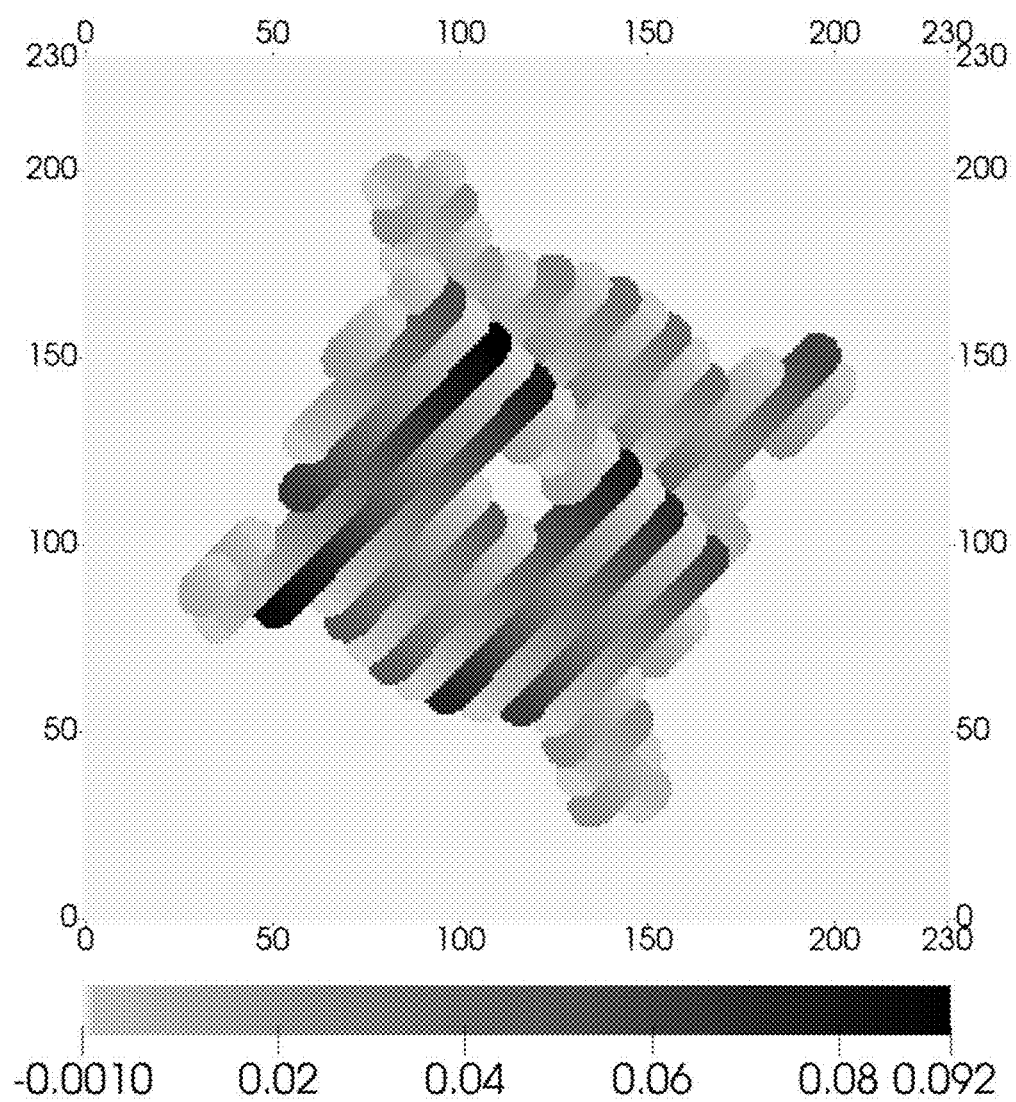
FIG. 6A is a diagram showing a 2D map representing the elapsed time of a laser at each location of scan lines measured from the onset of the scanning of each scan line in an example deposit layer.
Figure 6B:
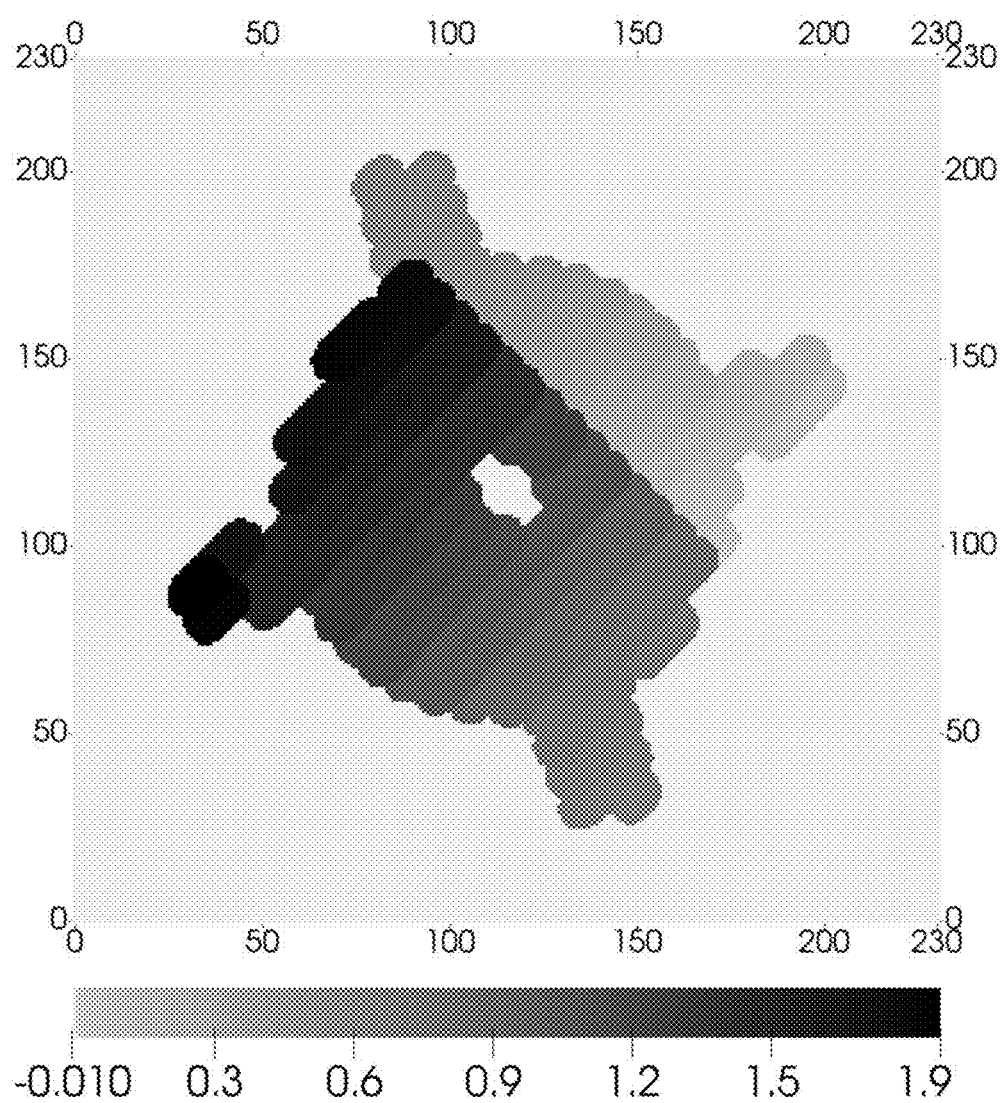
FIG. 6B is a diagram showing a 2D map representing the elapsed time of a laser at each location of scan lines measured from the onset of the scanning of an example deposit layer.
Figure 6C:
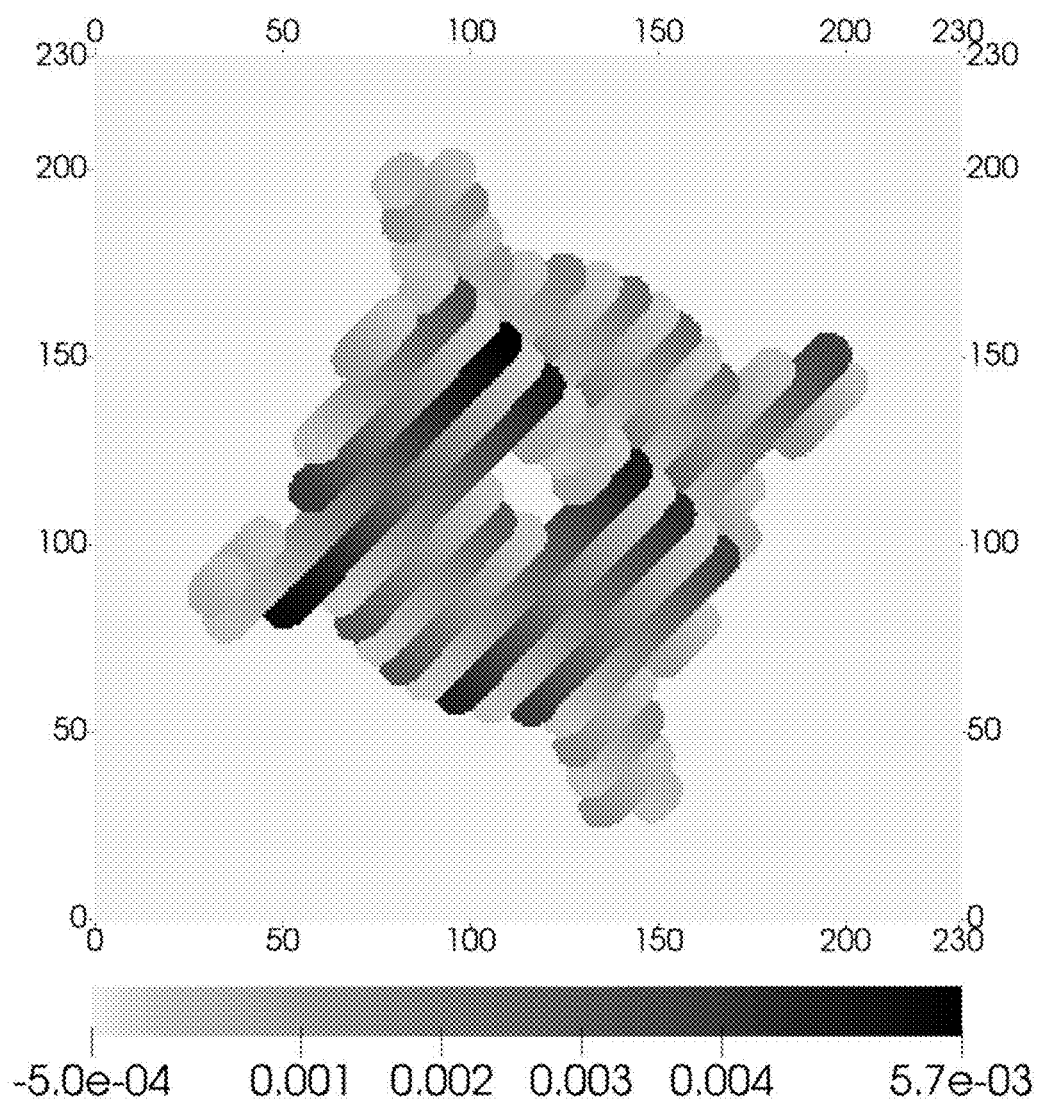
FIG. 6C is a diagram showing a 2D map representing a laser travelled distance of each location of scan lines, the laser travelled distance is measured from the start location of each scan line.

FIGS. 6A-6C shows 2D maps representing respective laser scan properties in an example deposit layer. FIG. 6A is a diagram showing a first 2D map 612 representing the elapsed time of a laser at each location of scan lines measured from the onset of the scanning of each scan line in the deposit layer. The first 2D map 612 contains about 230×230 grid points. Each grid point within the portion scanned by the laser contains a positive value. A void value (i.e., a small negative value) is assigned to all grid points in the beginning, therefore, the grid points in the non-scanned portion contain the negative value. For example, a small negative value (−0.001) can be used as a void value.

The first 2D map 612 contains multiple scan lines. Each scan line is scanned from the start location (shown with the darkest color in a scan line) to the stop location (shown with the lightest color in a scan line). The scale indicates the range of the elapsed time is between 0.00 and 0.092 seconds.

FIG. 6B is a diagram showing a second 2D map 614 representing the elapsed time of a laser at each location of scan lines measured from the onset of the scanning the deposit layer. The second 2D map 614 contains the same number of grid points as the first 2D map 612. Using a similar scheme, each grid point within the portion scanned by the laser contains a positive value. A void value or a small negative value is assigned to all grid points in the beginning, therefore, the grid points in the non-scanned portion contain the negative value. For example, a small negative number (−0.01) can be used as a void value.

The scale indicates the range of the elapsed time is between 0.0 and 1.9 seconds. There are multiple scan lines in the second 2D map 614. Since the elapsed time is measured from the beginning of scanning the deposit layer, the elapsed time corresponding to 0.0 at the start location of the first scan line has the lightest color. The elapsed time corresponding to roughly 1.9 seconds is at the stop location of the last scan line for the deposit layer.

FIG. 6C is a diagram showing a third 2D map 616 representing a distance between a particular location of a scan line and the start location of the same scan line in the deposit layer. In other words, the distance represents a laser travelled distance measured from the start location of each scan line. The third 2D map 616 contains the same number of grid points as that of the first 2D map 612 and the second 2D map 614. Due to a constant laser speed used for the scanning of the deposit layer, the third 2D map 616 has the same pattern as the first 2D map 612. Those having ordinary skill in the art would know that the third 2D map 616 would be very different from the first 2D map 612, when the laser speed is different for each scan line or different within a scan line. Substantially similar to the first and second 2D maps, a void value is assigned to all grid points before assigning the value to the portion of grid points corresponding to the scan lines. In one embodiment, the void value is set to −0.0005 m.

FIGS. 6A-6C are pseudo color plots. Colors are scaled to fit the values in the 2D map. Value range is shown in the bar below each plot. The minimum and maximum values are different for each plot. A standard normalization procedure is applied to all 2D maps before input to the machine learning model. For example, all of the particular 2D maps across the training set are normalized between 0 and 1.

Figure 6D:
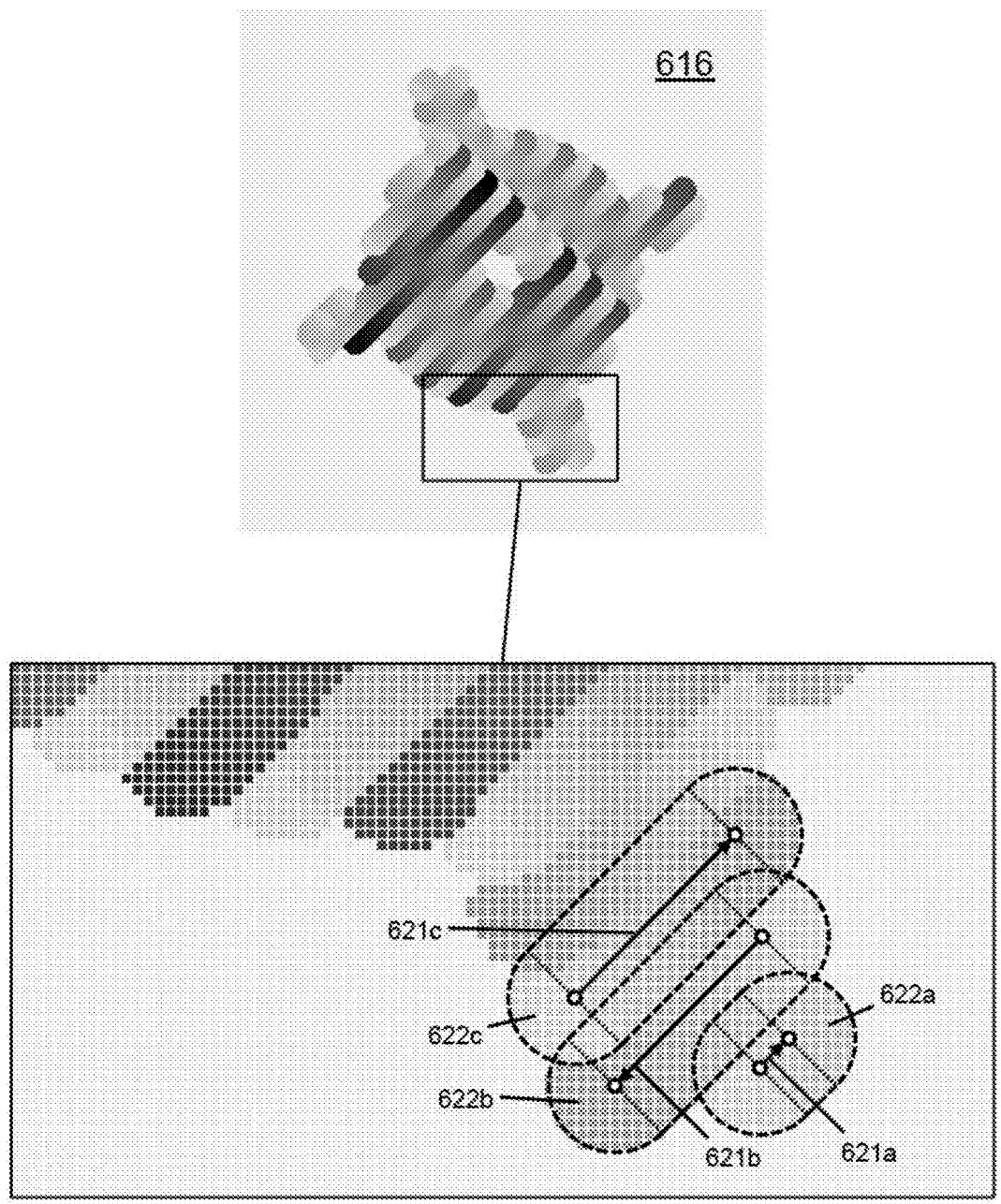
FIG. 6D is a diagram showing example influence vicinities in a 2D map.

To show the relationship of a laser influence vicinity within a 2D map, FIG. 6D shows three example laser influence vicinities 622a-622c in the third 2D map 616. Three scan lines 621a-621c are surrounded in three respective laser influence vicinities 622a-622c. Each laser influence vicinity contains an obround shape area. Two neighboring laser influence vicinities can overlap. The value of laser scan properties assigned in each grid point within the influence vicinity can overwrite the previously assigned value.

Figure 6E:
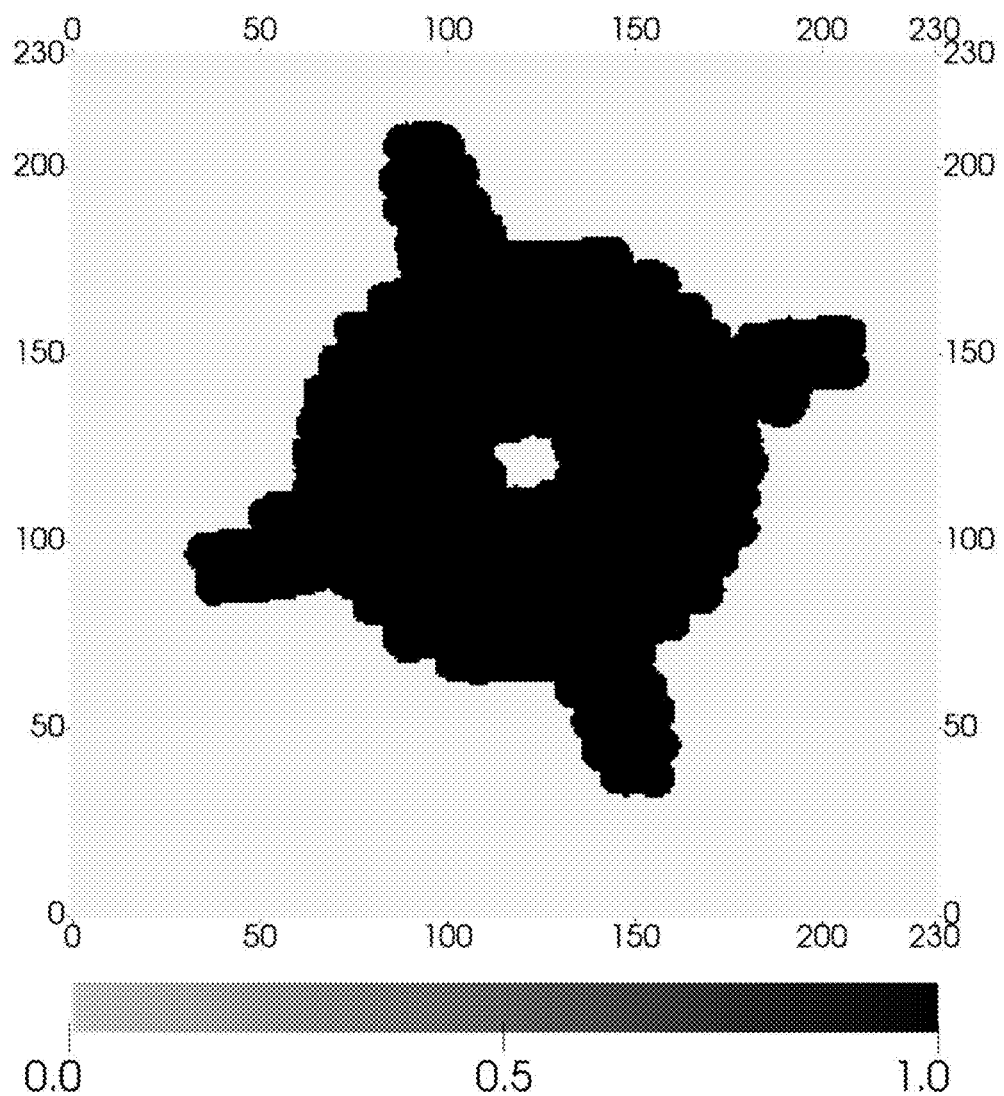
FIG. 6E is a diagram depicting an example state map representing a state of the immediately prior layer.

FIG. 6E is a diagram depicting an example state map 618 representing a state at the top of an immediately prior deposit layer. In one embodiment, the state can be represented by all scan lines in the immediately prior deposit layer. A value of one (1) means that grid point corresponding to a location was melted by the laser, and a value of zero (0) means that grid point corresponding to a location was not scanned by the laser. In another embodiment, the state can be the predicted physical behavior of the immediate prior deposit layer.

Information from the immediately prior layer's state map is not used in generating the 2D maps for the currently-scanned deposit layer, but it influences the physical behavior (e.g., thermal strain) of the current deposit layer.

Figure 7A:
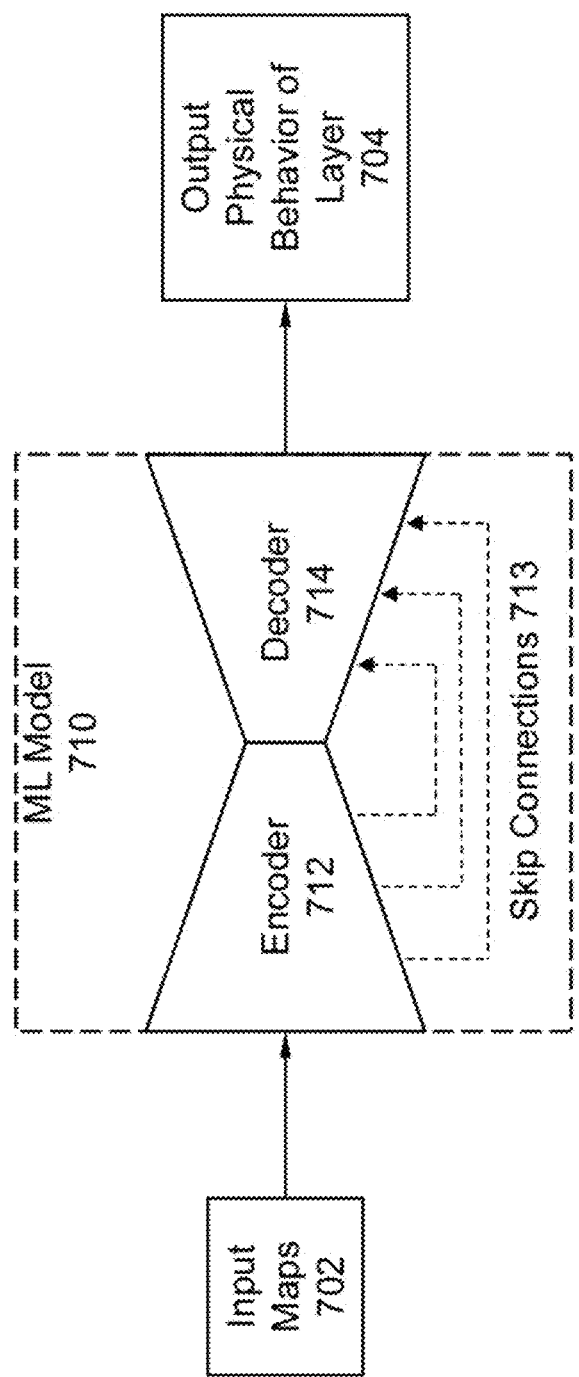
FIG. 7A is a schematic diagram illustrating an example machine learning model for predicting simulated physical behaviors of a layer of a physical object additively manufactured with a laser.

FIG. 7A is a schematic diagram illustrating an example machine learning model 710 for predicting a simulated physical behavior (i.e., thermal strain obtained in a simulation) of a layer of a physical object additively manufactured with a laser. The machine learning (ML) model 710 can be a network based on U-Net architecture that includes encoder blocks 712 coupled to decoder blocks 714. The encoder blocks 712 include one or more skip connections 713 to the decoder blocks 714. In one embodiment, scalar laser scan properties can be inserted at skip connections in the network. The scalar laser scan properties that may affect the predicted physical behaviors include, for example, hatch spacing, heater temperature, layer thickness.

Figure 7B:
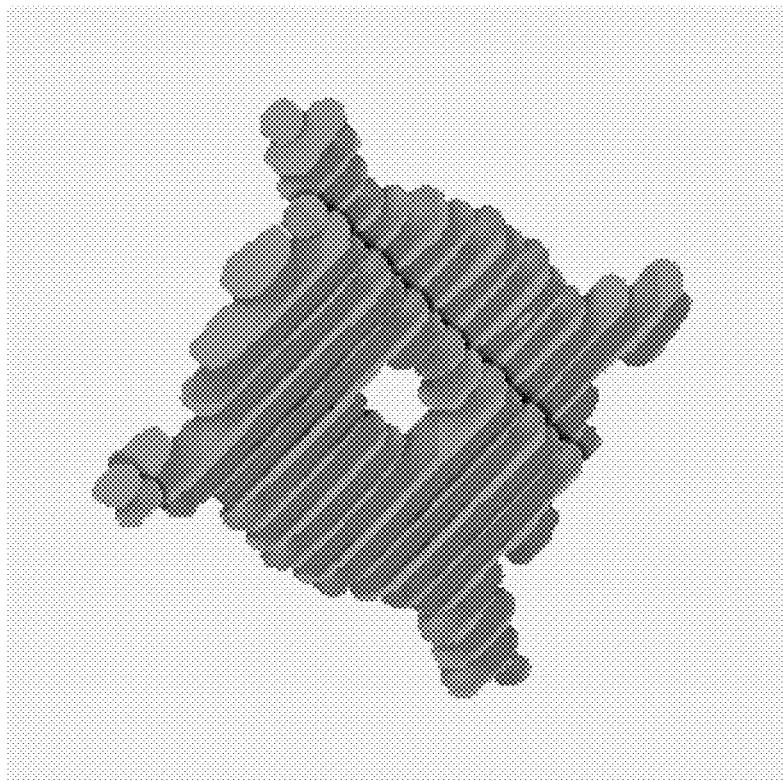
FIG. 7B is a diagram showing a 2D map representing an example physical behavior of a layer of the physical object, the layer corresponds to a deposit layer for the physical object additively manufactured.

The machine learning model 710 takes the 2D maps representing laser scan properties (e.g., 2D maps 612, 614, 616 respectively shown in FIGS. 6A-6C) for a deposit layer as an input 702. Also included in the input is a state map representing a state of an immediately prior deposit layer (e.g., the state map 618 is FIG. 6E). The output 704 contains a map representing a physical behavior of a layer corresponding to the deposit layer for the physical object. FIG. 7B shows an output 2D map 730 representing an example physical behavior of a layer of the physical object, the layer corresponds to a deposit layer for the physical object additively manufactured. The physical behavior can be thermal strain, coaxial average temperature, etc.

Figure 7C:
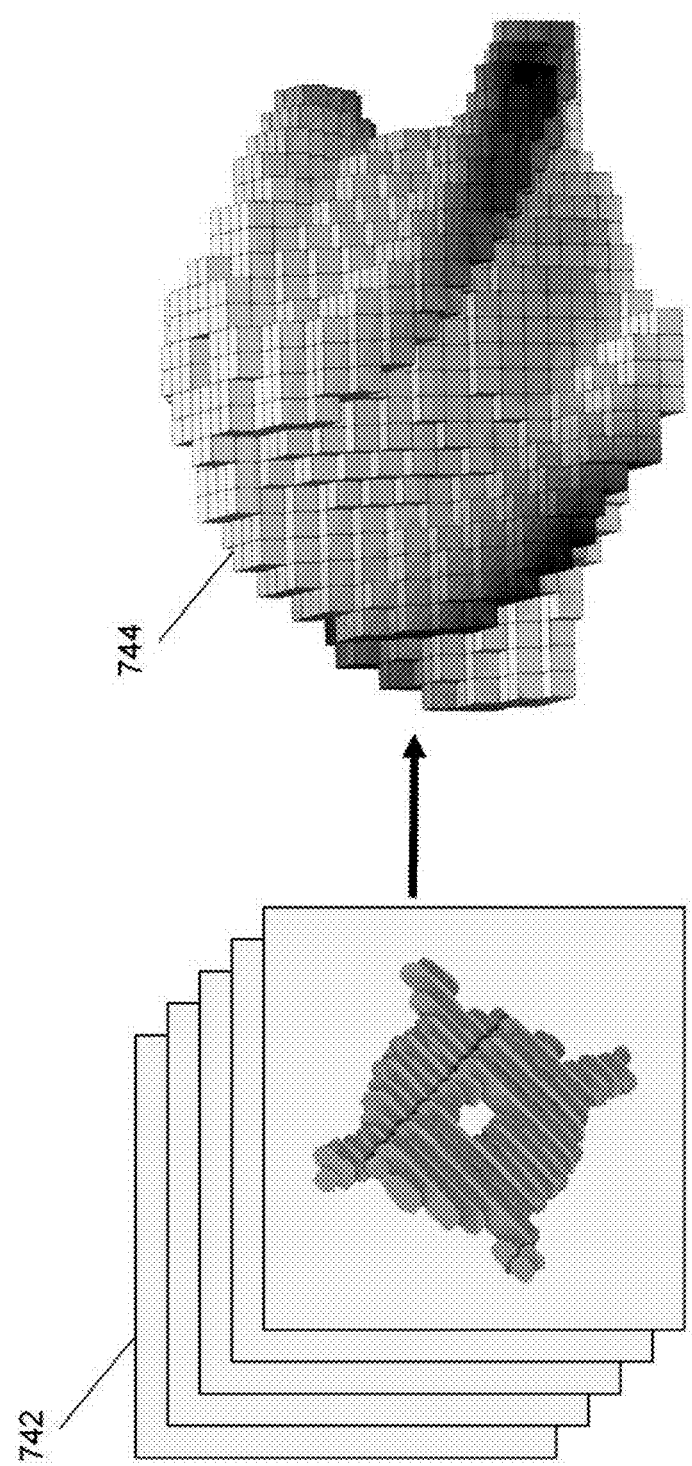
FIG. 7C is a diagram depicting an example workflow of analyzing mechanical behaviors of the physical object based on simulated thermal strains of deposit layers for a physical object.

FIG. 7C is a diagram depicting an example workflow 740 of analyzing mechanical behaviors 744 (e.g., displacements and stresses) of the physical object based on thermal strains 742 of all layers of a physical object. Thermal strain of each layer can be obtained in a simulation. Thermal strain of each layer can also be predicted from a trained machine learning model 710 as disclosed in this document.

FIG. 8A is a flowchart illustrating an example process 800 of creating a machine learning model for predicting a physical behavior of a layer of a physical object to be additively manufactured. Process 800 starts at action 802 by receiving a three-dimensional model (e.g., an MCAD model) for a physical object (i.e., structure, product, part, etc.) in a computer system (e.g., computer systems 1000, 1020 shown in FIG. 10A-10B). The physical object is additively manufactured with a heat source (e.g., a laser). The laser is driven or controlled by a set of instructions to scan deposit layers for additively manufacturing the physical object. The set of instructions specifies scan properties for scanning each deposit layer. In one embodiment, a three-dimensional MCAD model is processed by a slicer program to generate a set of scan instructions. The instructions specify scan properties of the laser for each deposit layer. And the scan instructions include a definition of one or more scan lines with each scan line having a start location and a stop location. Scan properties correspond to a location of a scan line in the deposit layer, and scan properties include, but are not limited to, laser speed, laser power, the distance from the onset of each scan line, elapsed time measured from the onset of scanning each scan line, elapsed time measured from the onset of scanning each deposit layer.

At action 804, a physical behavior of a layer of the physical object is obtained in a simulation of scanning the deposit layer for the physical object based on scan properties for the deposit layer. The layer of the physical object corresponds to the deposit layer. The physical behavior can be thermal strain, coaxial average temperature. The simulation can be a finite element analysis for thermal strain. Next, at action 806, two-dimensional (2D) maps are generated for representing scan properties for the deposit layer. Each 2D map includes values in 2D structured grid points (e.g., an array of grid points uniformly arranged in a rectangular formation) for the deposit layer. Each 2D map corresponds to a respective scan property for the deposit layer.

At action 808, a machine learning model is created for predicting the simulated physical behavior of the layer of the physical object using the 2D maps. The machine learning model can be a network based on U-Net architecture that includes encoder blocks coupled to decoder blocks based on convolution neural networks. The machine learning model products an output map representing the physical behavior of the layer from the 2D maps as an input. The input further includes a state map. The state map can be generated based on scan lines for an immediately prior deposit layer. The state map can also be generated based on physical behavior for an immediately prior deposit layer.

U-Net architecture is a convolutional neural network that was developed for biomedical image segmentation. The network is based on the fully convolutional network and its architecture was modified and extended to work with fewer training images and to yield more precise segmentations. The main idea is to supplement a usual contracting network by successive layers, where pooling operations are replaced by upsampling operators. Hence these layers increase the resolution of the output. What's more, a successive convolutional layer can then learn to assemble a precise output based on this information. One important modification in U-Net is that there are a large number of feature channels in the upsampling part, which allow the network to propagate context information to higher resolution layers. As a consequence, the expansive path is more or less symmetric to the contracting part, and yields a u-shaped architecture. The network only uses the valid part of each convolution without any fully connected layers. To predict the pixels in the border region of the image, the missing context is extrapolated by mirroring the input image. The U-Net architecture contains a contracting path and an expansive path, which gives it the u-shaped architecture. The contracting path is a typical convolutional network that contains repeated application of convolutions, each followed by a rectified linear unit (ReLU) and a max pooling operation. During the contraction, the spatial information is reduced while feature information is increased. The expansive pathway combines the feature and spatial information through a sequence of up-convolutions and concatenations with high-resolution features from the contracting path.

Example process 820 shown in FIG. 8B includes actions or operations for generating the 2D maps. At action 822, a portion of the grid points in a 2D map associated with a scan line is identified. Each grid point in the identified portion is located within an influence vicinity surrounding the scan line. Next, at action 824, a value of a respective scan property associated with a location of the scan line is determined based on the set of instructions for driving or controlling the laser used in additive manufacturing of the physical object. Then, at action 826, the determined value is assigned as a value of a grid point in the portion scanned by the laser. The grid point is located within the influence vicinity corresponding to the location of the scan line.

FIG. 8C is a flowchart showing an example process 830 of assigning values of scan properties to grid points that represent each of the 2D maps, the 2D maps are the input to the machine learning model for predicting a simulated physical behavior of a layer of the physical object. At action 832, a respective laser property value corresponding to the start location of a scan line is assigned as a value of grid points located within a semi-circular area behind the start location. At action 834, a respective laser property value corresponding to a particular location of a scan line between the start location and the stop location is assigned as a value of grid points in a rectangular area straddling the scan line. Each of the grid points and the particular location are aligned substantially normal to the scan line at the particular location. At action 836, a respective laser property value corresponding to the stop location of a scan line is assigned as a value of grid points located within a semi-circular area past the stop location.

FIG. 8D is a flowchart illustrating an example process 840 of predicting a simulated physical behavior (i.e., a physical behavior obtained in a simulation) of a layer of a physical object additively manufactured with a laser using a trained machine learning model. Process 840 starts at action 842 by receiving a three-dimensional model (e.g., an MCAD model) for a physical object in a computer system. The physical object is additively manufactured with a laser. The laser is driven or controlled by a set of instructions to scan deposit layers for the physical object. The instructions specify scan properties for scanning each deposit layer.

Next, at action 844, two-dimensional (2D) maps are generated for representing scan properties for the deposit layer. Each 2D map includes values in 2D structured grid points (e.g., an array of grid points uniformly arranged in a rectangular formation) for the deposit layer. Each 2D map corresponds to a respective scan property for the deposit layer. Then, at action 846, a trained machine learning model is invoked for predicting a simulated physical behavior of a layer of the physical object based on the 2D maps as an input. The machine learning model products an output map representing the physical behavior of the layer from the 2D maps as an input. The layer corresponds to the deposit layer being scanned. The input can further include a state map. The state map can be generated based on scan lines for an immediately prior deposit layer. The state map can also be generated based on physical behavior for an immediately prior deposit layer.

Figure 9A:
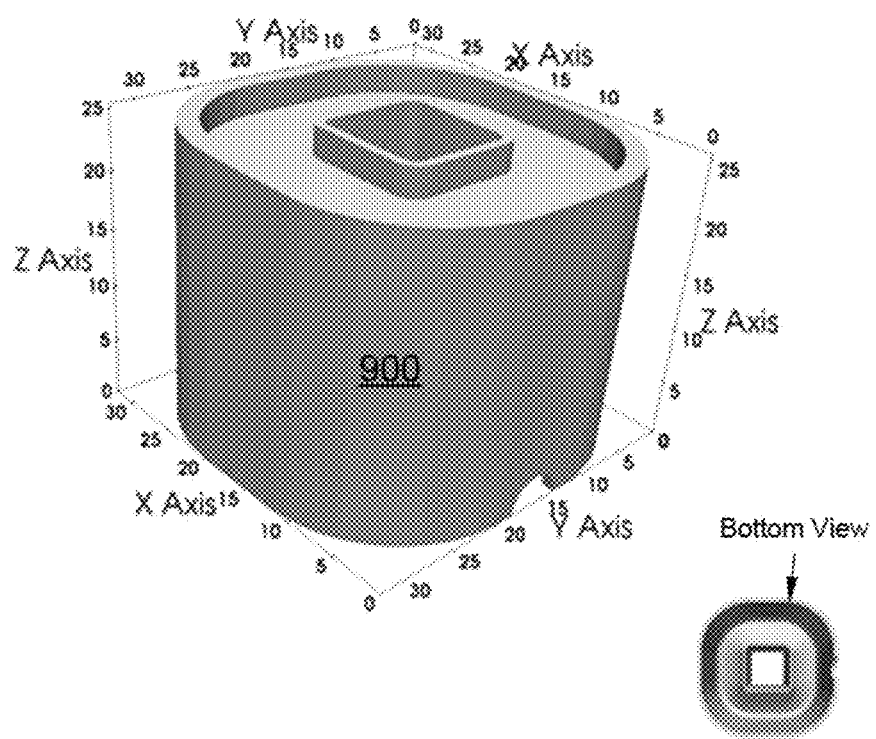
Figure 9D:
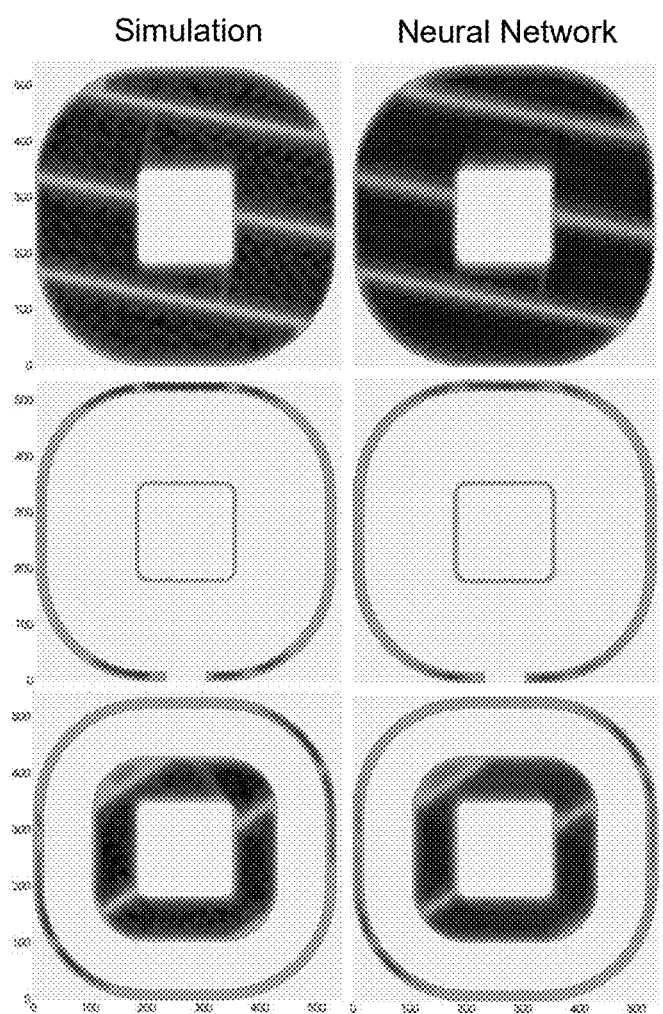

A comparison study is shown in FIGS. 9A-9D between simulation and machine learning for predicting physical behaviors (e.g., lateral displacement along an edge) of an example physical object (i.e., a canonical part 900) additively manufactured with a laser. The canonical part 900 shown in FIG. 9A is made of a high strength material with a size about 32 mm cube. Slicer program divides the canonical part 900 into 635 layers or slices. About 700,000 scan lines are generated for the laser to scan during the additive manufacturing process. Two 2D maps shown in FIG. 9B are generated based on the methods disclosed this document. The first 2D map 912 represents laser elapsed time measured from the onset of scanning of each scan line in an example deposit layer. Since constant laser speed is used in the comparison study, the first 2D map can also represent laser travelled distance from the start of each scan line. The second 2D map 914 represents laser elapsed time measured from the onset of scanning the deposit layer. FIG. 9C shows a comparison of X-displacement (one of the lateral displacements) along a vertical edge 922. X-displacement of the canonical part is presented as three-dimensional plot 920. The X-displacement along the vertical edge (i.e., z-coordinate) is represented as a plot 924. Two results are compared between 'reheating strain' based on a simulation and 'machine learning strain' based on predicted thermal strain using a trained machine learning model. The accuracy is about 97% between two approaches as indicated by a mean relative error of 2.97%. FIG. 9D is a visual comparison of thermal strains generated based on simulation and machine learning. The left column contains 2D maps of thermal strains in three arbitrarily chosen layers obtained in simulation. The right column contains corresponding 2D maps of thermal strains predicted by a trained machine learning model. Based on the comparison, the predicted thermal strain using a trained machine learning model can match the simulated results. Time required to conduct a simulation to obtain/determine thermal strain for all 635 layers is about 7.5 hours. It takes about 8.5 minutes for inference using a trained machine learning model. Additionally, inference time of a trained machine learning model would be the same for different material types. However, the simulation time will increase if more diffusive materials are used.

The subject matter described herein may be implemented using any suitable processing system with any suitable combination of hardware, software and/or firmware, such as described below with reference to the non-limiting examples shown in FIGS. 10A-10D.

Figure 10A:
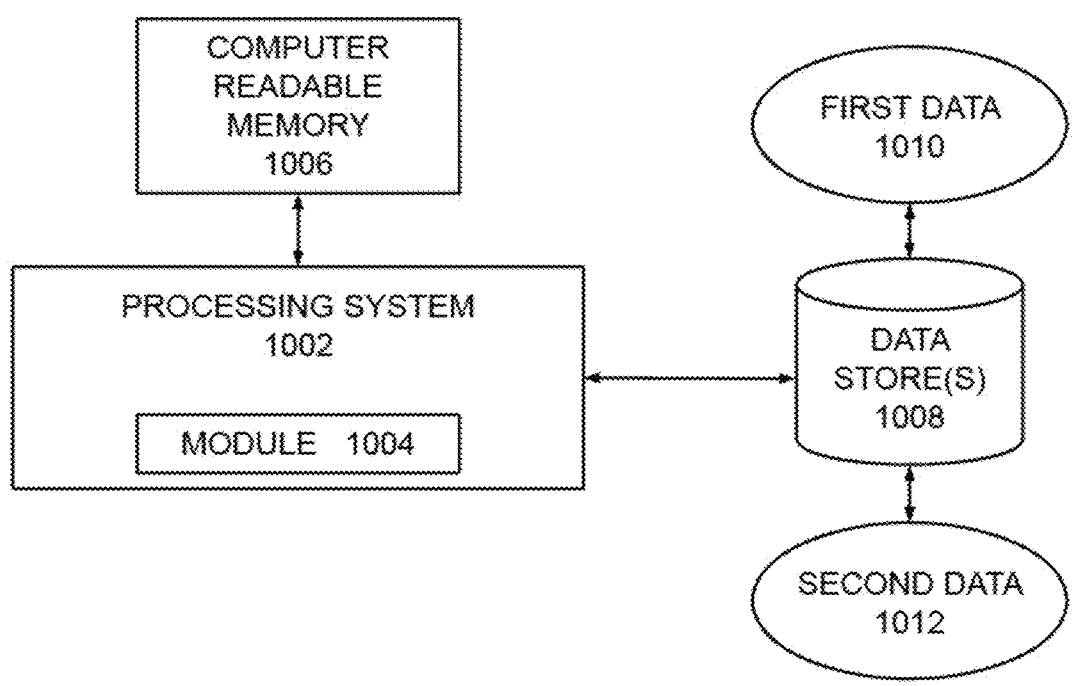
FIG. 10A is a block diagram showing an example system including a standalone computing architecture.

FIG. 10A depicts an example system 1000 that includes a standalone computer architecture where a processing system 1002 (e.g., one or more computer processors) includes a module 1004 (e.g., software module stored in memory) being executed on it. The processing system 1002 has access to a non-transitory computer-readable memory 1006 in addition to one or more data stores 1008. The one or more data stores 1008 may contain first data 1010 as well as second data 1012.

Figure 10B:
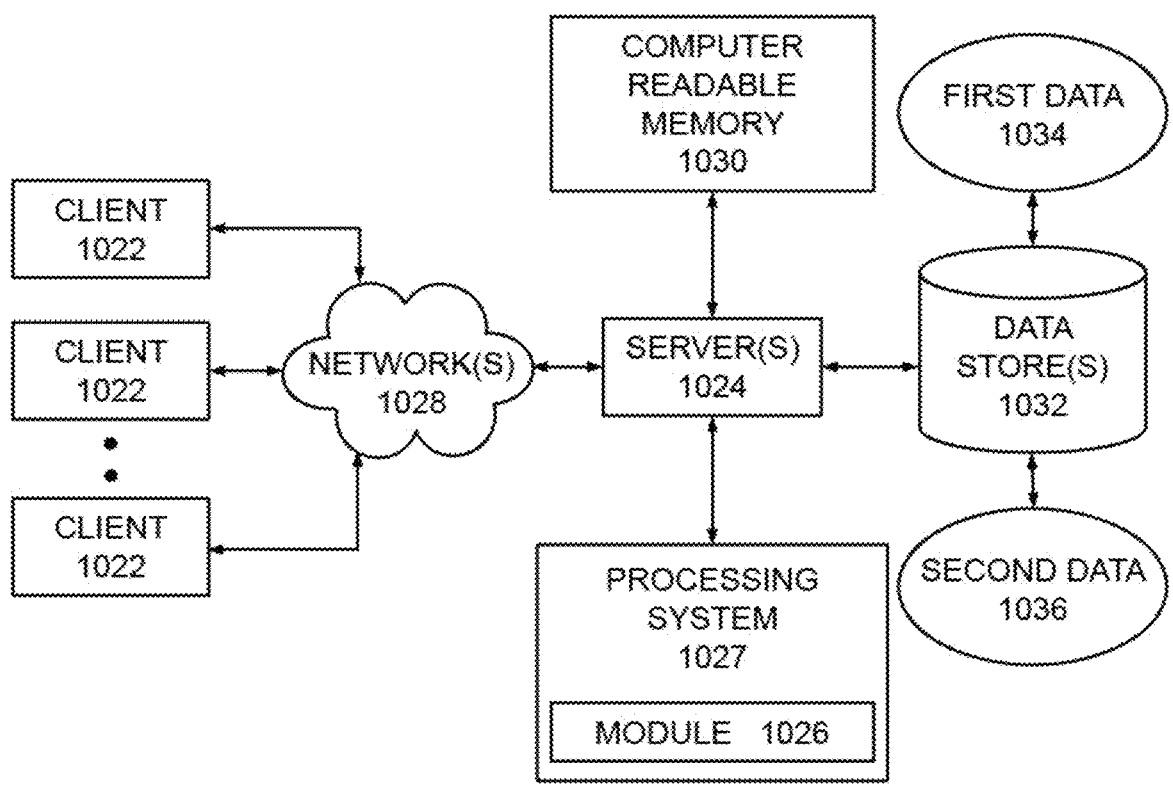
FIG. 10B is a block diagram showing an example system including a client-server computing architecture.

FIG. 10B depicts another example system 1020 that includes a client-server architecture. One or more clients 1022 (e.g., user personal computer, workstation, etc.) accesses one or more servers 1024 executing computer instructions of a module 1026 (e.g., software module stored in memory) on a processing system 1027 via one or more networks 1028. The one or more servers 1024 may access a non-transitory computer readable memory 1030 as well as one or more data stores 1032. The one or more data stores 1032 may contain first data 1034 as well as second data 1036.

Figure 10C:
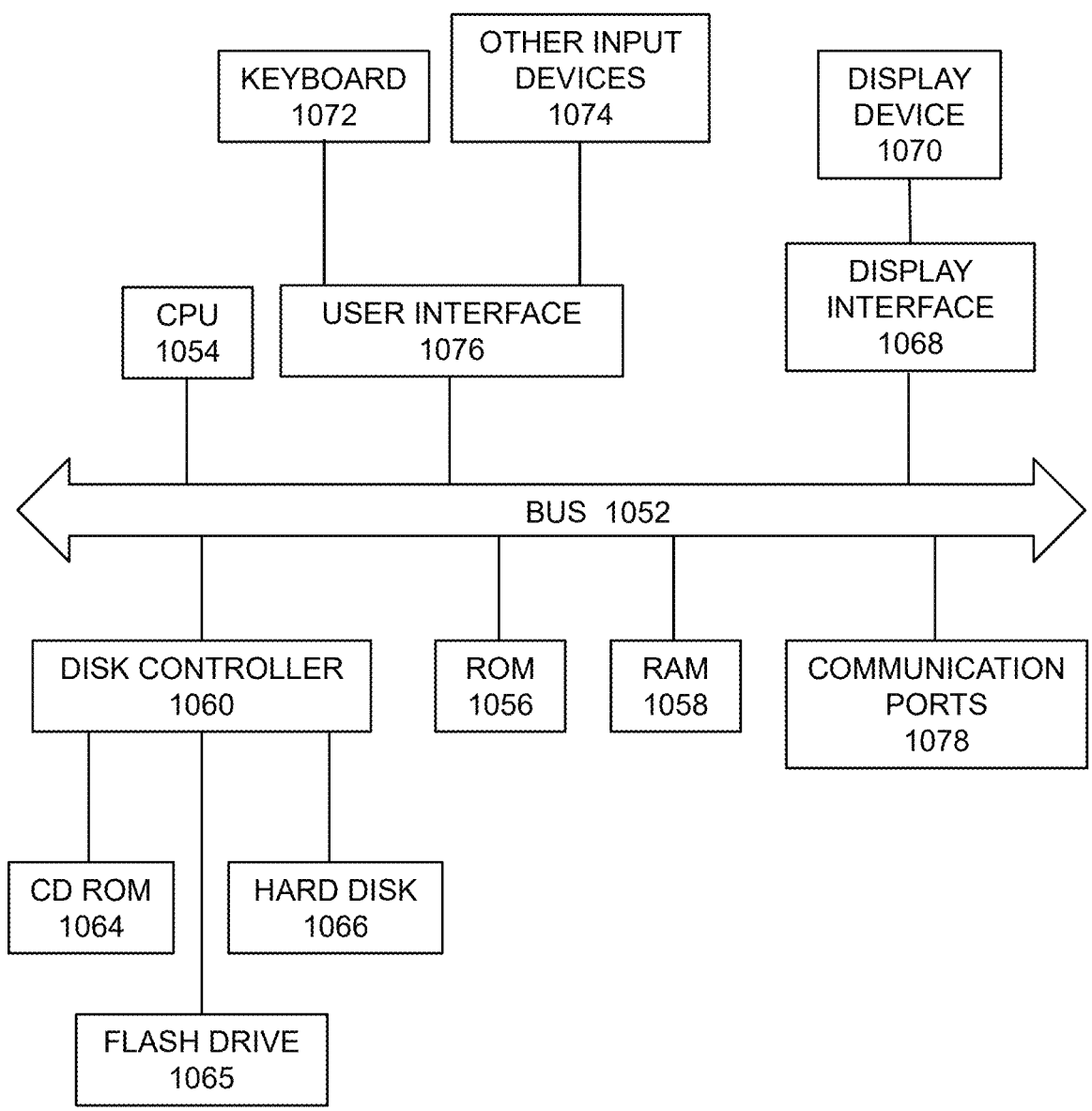
FIG. 10C is a function block diagram showing salient components of an example computing device for implementing the subject matters described herein.

FIG. 10C shows a function block diagram of example hardware for a standalone computer architecture 1050, such as the architecture depicted in FIG. 10A, that may be used to contain and/or implement the subject matter described herein. A bus 1052 may serve as the information highway interconnecting the other illustrated components of the hardware. A processing system 1054 labeled CPU (central processing unit) (e.g., one or more computer processors), may perform calculations and logic operations required to execute a program/software/module. A non-transitory computer-readable storage medium, such as read only memory (ROM) 1056 and random access memory (RAM) 1058, may be in communication with the processing system 1054 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium thru communication port 1078.

A disk controller 1060 interfaces one or more optional disk drives to the system bus 1052. These disk drives may be external or internal flash memory drives 1065, external or internal CD-ROM, CD-R, CD-RW or DVD drives 1064, or external or internal hard disk drives 1066. As indicated previously, these various disk drives and disk controllers are optional devices.

If needed, the processor 1054 may access each of the following components: real-time data buffer, conveyors, file input processor, database index shared access memory loader, reference data buffer and data managers. Each component may include a software application stored in one or more of the disk drives connected to the disk controller 1060, the ROM 1056 and/or the RAM 1058.

A display interface 1068 may permit information from the bus 1052 to be displayed on a display 1070 in audio, video, graphical, text, or alphanumeric format.

In addition to the standard computer-type components, the hardware may also include data input devices, such as a keyboard 1072, or other input device 1074, such as a microphone, remote control, pointer, mouse, touch screen, and/or joystick.

Figure 10D:
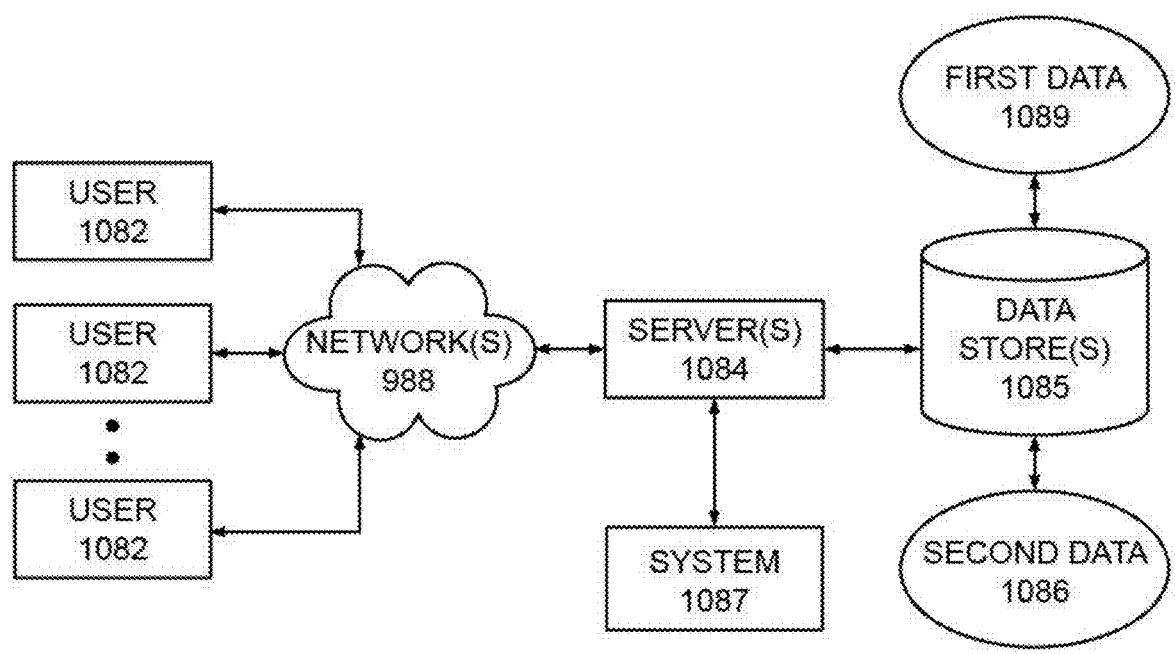
FIG. 10D is a block diagram illustrating an example computer-implemented environment.

FIG. 10D depicts a computer-implemented environment 1080 wherein users 1082 can interact with a system 1087 hosted on one or more servers 1084 through a network 1088. The system 1087 contains software operations or routines. The users 1082 can interact with the system 1087 through a number of ways, such as over one or more networks 1088. One or more servers 1084 accessible through the network(s) 1088 can host the system 1087. The processing system 1087 has access to a non-transitory computer-readable memory in addition to one or more data stores 1085. The one or more data stores 1085 may contain a first data 1089 as well as a second data 1086. It should be understood that the system 1087 could also be provided on a stand-alone computer for access by a user.

This written description describes example embodiments of the subject matter, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

Additionally, used herein, the terms "vertical", "horizontal", "width", "height", "up", "down", "top", "bottom", "left", and "right", are intended to provide relative positions/locations for the purposes of description, and are not intended to designate an absolute frame of reference. Further, the order of blocks in process flowcharts or diagrams do not inherently indicate any particular order nor imply any limitations.

Although the subject matter has been described with reference to specific embodiments thereof, these embodiments are merely illustrative, and not restrictive of, the invention. Various modifications or changes to the specifically disclosed example embodiments will be suggested to persons skilled in the art. Whereas only four 2D maps representing laser scan properties have been described and shown to be the input to a machine learning model for predicting physical behavior. Other number of 2D maps may be used for achieving the same, for example, five, six or more. Furthermore, whereas the scan lines have been shown and described as straight line segments, other types of line segments can be used for achieving the same, for example, curved line segments. In summary, the scope of the subject matter should not be restricted to the specific example embodiments disclosed herein, and all modifications that are readily suggested to those of ordinary skill in the art should be included within the spirit and purview of this application and scope of the appended claims.

What is claimed is:

1. A computer-implemented method comprising:
   receiving a three-dimensional model for additively manufacturing a physical object with a laser driven by a set of instructions to scan a plurality of deposit layers for the physical object, the instructions specifying scan properties for scanning each deposit layer of the plurality of deposit layers;
   for each deposit layer of the plurality of deposit layers, simulating a physical behavior of the deposit layer of the physical object when additively manufactured, by:
   generating two or more two-dimensional (2D) maps representing the scan properties for the deposit layer, each 2D map of the two or more 2D maps including values in grid points representing the deposit layer, each 2D map corresponding to a respective scan property for the deposit layer;

providing the two or more 2D maps for the deposit layer as input to a machine learning model, wherein the machine learning model is configured for predicting the physical behavior of the deposit layer and creating a layer prediction based thereon;

creating a physical object prediction based on a plurality of layer predictions corresponding to the plurality of layers, wherein the physical object prediction describes the physical behavior of the physical object when additively manufactured.

2. The method of claim 1, wherein the instructions comprises a scan line for scanning the deposit layer by the laser, the scan line having a start location and a stop location, wherein scanning the deposit layer includes scanning the scan line from the start location to the stop location.

3. The method of claim 2, wherein the generating 2D maps comprises:

identifying a portion of the grid points associated with the scan line, wherein each grid point in the identified portion is located within an influence vicinity surrounding the scan line.

4. The method of claim 3, wherein the identified portion includes a first grid point and a second grid point, wherein the first grid point is located with the influence vicinity corresponding to the start location, and wherein the second grid point is located within the influence vicinity corresponding to the stop location.

5. The method of claim 4, wherein the influence vicinity corresponding to the start location includes a first semi-circular area and wherein the influence vicinity corresponding to the stop location includes a second semi-circular area.

6. The method of claim 4, wherein the identified portion includes a third grid point located within the influence vicinity corresponding to a particular location of the scan line between the start location and the stop location, wherein the third grid point and the particular location are aligned substantially normal to the scan line at the particular location.

7. The method of claim 3, the method further comprising:

determining a value of the respective scan property associated with a location of the scan line based on the instructions; and assigning the determined value as a value of a grid point in the identified portion, wherein the grid point is located within the influence vicinity corresponding to the location of the scan line.

8. The method of claim 7, wherein the value associated with the location for a first map and a second map of the two or more 2D maps indicates a different one of:

an elapsed time of scanning the location from an onset of the scanning the deposit layer;

an elapsed time of scanning the location from an onset of the scanning the scan line; and a distance between the start location and the location of the scan line.

9. The method of claim 7, wherein the value associated with the location for a first map, a second map, and a third map of the two or more 2D maps indicates a different one of:

an elapsed time of scanning the location from an onset of the scanning the deposit layer;

an elapsed time of scanning the location from an onset of the scanning the scan line; and a distance between the start location and the location of the scan line.

10. The method of claim 7, wherein the value associated with the location for a first map, a second map, a third map, and a fourth map of the two or more 2D maps comprises a different one of:

an elapsed time of scanning the location from an onset of the scanning the deposit layer;

an elapsed time of scanning the location from an onset of the scanning the scan line;

a distance between the start location and the location of the scan line; and a laser power for scanning the location of the scan line.

11. The method of claim 7, wherein the value associated with the location comprises a laser power for scanning the location of the scan line.

12. The method of claim 7, wherein the value associated with the location comprises a laser speed for scanning the location of the scan line.

13. The method of claim 1, wherein the physical behavior comprises thermal strains of the deposit layer.

14. The method of claim 1, wherein the input to the machine learning model further comprises a 2D state map generated based on scan lines for an immediately prior deposit layer.

15. The method of claim 1, wherein the input to the machine learning model further comprises a 2D state map generated based on the layer prediction for an immediately prior deposit layer.

16. The method of claim 1, further comprising:

receiving a plurality of three-dimensional models for additively manufacturing physical objects;

using a simulation software, creating a simulation result for each of the plurality of three-dimensional models, wherein the simulation result describes the physical behavior of that three dimensional model when additively manufactured; and training and configuring the machine learning model based on the simulation results for the plurality of three-dimensional models.

17. A system comprising:

a memory storing instructions; and one or more processors coupled to the memory, the one or more processors executing the instructions from the memory to perform a method comprising:

receiving a three-dimensional model for additively manufacturing a physical object with a laser driven by a set of instructions to scan a plurality of deposit layers for the physical object, the instructions specifying scan properties for scanning each deposit layer of the plurality of deposit layers;

for each deposit layer of the plurality of deposit layers, simulating a physical behavior of the deposit layer of the physical object when additively manufactured, by:

generating two or more two-dimensional (2D) maps representing the scan properties for the deposit layer, each 2D map of the two or more 2D maps including values in grid points representing the deposit layer, each 2D map corresponding to a respective scan property for the deposit layer; and providing the two or more 2D maps for the deposit layer as input to a machine learning model, wherein the machine learning model is configured for predicting the physical behavior of the deposit layer and creating a layer prediction based thereon;

creating a physical object prediction based on a plurality of layer predictions corresponding to the plurality of layers, wherein the physical object prediction describes the physical behavior of the physical object when additively manufactured.

18. A computer-implemented method comprising:
receiving a three-dimensional model for additively manufacturing a physical object with a laser driven by a set of instructions to scan deposit layers for the physical object, the instructions specifying scan properties for scanning each deposit layer;
generating two-dimensional (2D) maps representing the scan properties for a deposit layer, each 2D map including values in grid points representing the deposit layer, each 2D map corresponding to a respective scan property for the deposit layer; and
invoking a trained machine learning model to predict a physical behavior of a layer of the physical object based on the 2D maps, the layer of the physical object corresponding to the deposit layer.

19. The method of claim 18, wherein the instructions comprises a scan line for the deposit layer, the scan line having a start location and a stop location, wherein scanning the deposit layer includes scanning the scan line from the start location to the stop location.

20. The method of claim 19, wherein the generating 2D maps comprises: identifying a portion of the grid points associated with the scan line, wherein each grid point in the identified portion is located within an influence vicinity surrounding the scan line.

21. The method of claim 20, wherein the identified portion includes a first grid point and a second grid point, wherein the first grid point is located with the influence vicinity corresponding to the start location, and wherein the second grid point is located within the influence vicinity corresponding to the stop location, wherein the influence vicinity corresponding to the start location includes a first semi-circular area and wherein the influence vicinity corresponding to the stop location includes a second semi-circular area.

22. The method of claim 21, wherein the identified portion includes a third grid point located within the influence vicinity corresponding to a particular location of the scan line between the start location and the stop location, wherein the third grid point and the particular location are aligned substantially normal to the scan line at the particular location.

23. The method of claim 20, the method further comprising:
determining a value of the respective scan property associated with a location of the scan line based on the instructions; and
assigning the determined value as a value of a grid point in the identified portion, wherein the grid point is located within the influence vicinity corresponding to the location of the scan line.

24. A system comprising:
a memory storing instructions; and one or more processors coupled to the memory, the one or more processors executing the instructions from the memory to perform a method comprising:
receiving a three-dimensional model for additively manufacturing a physical object with a laser driven by a set of instructions to scan deposit layers for the physical object, the instructions specifying scan properties for scanning each deposit layer;
generating two-dimensional (2D) maps representing the scan properties for a deposit layer, each 2D map including values in grid points representing the deposit layer, each 2D map corresponding to a respective scan property for the deposit layer; and
invoking a trained machine learning model to predict a physical behavior of a layer of the physical object based on the 2D maps, the layer of the physical object corresponding to the deposit layer.

* * * * *